(12) United States Patent
Rhee et al.

(10) Patent No.: US 12,537,269 B2
(45) Date of Patent: Jan. 27, 2026

(54) BATTERY CELL, AND BATTERY MODULE AND BATTERY PACK INCLUDING THE SAME

(71) Applicant: SK On Co., Ltd., Seoul (KR)

(72) Inventors: Seo Roh Rhee, Daejeon (KR); Gyu Jin Chung, Daejeon (KR); Won Seok Jeong, Daejeon (KR); Ha Chul Jeong, Daejeon (KR); Yang Kyu Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 106 days.

(21) Appl. No.: 17/486,076

(22) Filed: Sep. 27, 2021

(65) Prior Publication Data
US 2022/0102818 A1 Mar. 31, 2022

(30) Foreign Application Priority Data

Sep. 29, 2020 (KR) .................... 10-2020-0127429

(51) Int. Cl.
*H01M 50/54* (2021.01)
*H01M 50/176* (2021.01)
(Continued)

(52) U.S. Cl.
CPC ......... *H01M 50/54* (2021.01); *H01M 50/176* (2021.01); *H01M 50/209* (2021.01);
(Continued)

(58) Field of Classification Search
CPC .. H01M 50/54; H01M 50/176; H01M 50/209; H01M 50/474; H01M 50/548; H01M 50/553; H01M 50/566; H01M 50/105; H01M 50/116; H01M 50/131; H01M 50/15; H01M 50/211; H01M 50/30;
(Continued)

(56) References Cited

U.S. PATENT DOCUMENTS 9,099,696 B2 8/2015 Ahn et al.
2010/0136381 A1* 6/2010 Yang ................. H01G 11/72
429/129

(Continued)

FOREIGN PATENT DOCUMENTS

CN 209515844 U 10/2019
CN 110518156 A 11/2019
(Continued)

OTHER PUBLICATIONS

English translation of KR101908583 B1 (Year: 2014).*

*Primary Examiner* — Ula C Ruddock
*Assistant Examiner* — Sarika Gupta
(74) *Attorney, Agent, or Firm* — The Webb Law Firm

(57) ABSTRACT

A battery cell includes a casing having an accommodation space formed therein and having one or both ends open; a cover plate covering one or both open ends of the casing; and an electrode assembly accommodated in the accommodation space, in which a plurality of electrode plates are stacked with a separator interposed therebetween. The electrode assembly includes electrode connection portions, respectively extending from the plurality of electrode plates; and a terminal bonded to the electrode connection portion and having a portion exposed outwardly through the cover plate.

16 Claims, 20 Drawing Sheets

(51) Int. Cl.
*H01M 50/209* (2021.01)
*H01M 50/474* (2021.01)
*H01M 50/548* (2021.01)
*H01M 50/553* (2021.01)
*H01M 50/566* (2021.01)

(52) U.S. Cl.
CPC ....... *H01M 50/474* (2021.01); *H01M 50/548* (2021.01); *H01M 50/553* (2021.01); *H01M 50/566* (2021.01)

(58) Field of Classification Search
CPC ............. H01M 50/502; H01M 50/507; H01M 50/528; H01M 50/178; H01M 50/147; H01M 50/148; H01M 50/636; Y02E 60/10; Y02P 70/50
See application file for complete search history.

(56) References Cited

U.S. PATENT DOCUMENTS

| | | | | |
|---|---|---|---|---|
| 2011/0117404 | A1* | 5/2011 | Ahn | H01M 50/16 |
| | | | | 429/94 |
| 2015/0372283 | A1* | 12/2015 | Yang | H01M 50/569 |
| | | | | 429/178 |
| 2019/0319295 | A1* | 10/2019 | Kim | H01M 50/15 |
| 2020/0411924 | A1* | 12/2020 | Yun | H01M 50/569 |
| 2021/0036379 | A1* | 2/2021 | Zhou | H01M 50/54 |
| 2021/0126293 | A1* | 4/2021 | Wang | H01M 10/4214 |

FOREIGN PATENT DOCUMENTS

| | | |
|---|---|---|
| KR | 1020110053835 A | 5/2011 |
| KR | 101908583 B1 * | 1/2014 |
| KR | 1020190001408 A | 1/2019 |

* cited by examiner

BATTERY CELL, AND BATTERY MODULE AND BATTERY PACK INCLUDING THE SAME

CROSS-REFERENCE TO RELATED APPLICATION

This application claims priority to Korean Patent Application No. 10-2020-0127429 filed Sep. 29, 2020, the disclosure of which is hereby incorporated by reference in its entirety.

BACKGROUND OF THE INVENTION

1. Field of the Invention

The present disclosure relates to a secondary battery cell capable of charging and discharging electricity, a battery module including a plurality of stacked battery cells, and a battery pack in which a plurality of units, each including stacked battery cells, are installed.

2. Description of Related Art

Unlike primary batteries, secondary batteries may be charged with and discharged of electricity, and thus may be applied to devices within various fields such as digital cameras, mobile phones, notebook computers, and hybrid vehicles. Examples of secondary batteries include nickel-cadmium batteries, nickel-metal hydride batteries, nickel-hydrogen batteries, lithium secondary batteries, and the like.

Among such secondary batteries, a large amount of research into lithium secondary batteries having high energy density and a high discharge voltage is in progress. Recently, lithium secondary batteries have been configured to have the form of a battery module provided by modularizing a number of battery cells manufactured as pouch-type cells having flexibility and have been used.

FIG. 1 is a perspective view of a pouch-type battery cell 10 according to the related art, FIG. 2 is a cross-sectional view taken along line I-I' of FIG. 1, and FIG. 3 is a cross-sectional view illustrating a state in which a plurality of battery cells 10 are connected to a bus bar 31.

Referring to FIGS. 1 and 2, in a pouch-type battery cell 10 according to the related art, an electrode assembly 20 may be accommodated in an accommodation space 15 formed inside a pouch 11.

The electrode assembly 20 may include a plurality of electrode plates 21 and an electrode connection portion 22 extending from each of the electrode plates 21, and may be accommodated in the pouch 11. The electrode plate 21 may include a positive electrode plate and a negative electrode plate, and the electrode assembly 20 may have a structure in which a positive electrode plate and a negative electrode plate are stacked with a separator interposed therebetween while large surfaces of the positive electrode plate and the negative electrode plate face each other. In addition, a plurality of positive electrode plates and a plurality of negative electrode plates may respectively be provided with the electrode connection portion 22, and may be connected to an electrode lead 25 in such a manner that the same polarities are in contact with each other. In this case, a portion of the electrode lead 25 may be exposed outwardly of the pouch 11.

The pouch 11 may include a sealing portion 12 sealing a periphery of the accommodation space 15 accommodating the electrode assembly 20. The sealing portion 12 may be formed in the form of a flange extending outwardly of the accommodation space 15. The sealing portion 12 may be divided into a first sealing portion 13, in which the electrode lead 25 is disposed, and a second sealing portion 14 in which the electrode lead 25 is not disposed.

In addition, the pouch-type battery cell 10 according to the related art may have a configuration in which an insulating portion 26 is disposed to increase the sealing degree of the sealing portion in a position in which the electrode lead 25 is led out, and to secure an electrical insulation state.

Referring to FIG. 2, significant loss may occur in the pouch-type battery cell 10 according to the related art in a length direction of the battery cell 10 due to not only a length of a bonding area A1 in which the electrode connection portion 22 and the electrode lead 25 are welded, but also a gap between the electrode connection portion 22 and the insulating portion 26, a length of the sealing area A2 sealing a center of the insulating portion 26 and the electrode lead 25 and the pouch 11, a length of the insulating portion 26 exposed inwardly and outwardly of the sealing area A2, a length of the electrode lead 25 exposed outwardly of the insulating portion 26, and the like. For example, a loss of about 20 mm per exposed portion of one electrode lead 25 may occur. When the electrode leads 25 are installed on both sides of the battery cell 10 in a length direction, as illustrated in FIG. 1, a loss of 40 mm may occur. In addition, since the second sealing portion 14 is formed on an upper surface of the pouch-type battery cell 10 according to the related art, spatial loss may also occur in a height direction.

In addition, the plurality of battery cells 10 may be coupled to a bus bar assembly 30 for electrical connection. As illustrated in FIG. 3, the bus bar assembly 30 may include a conductive bus bar 31 and an insulating member 35 formed of an insulating material. In the case of the related art, the first sealing portion 13 and the electrode lead 25 are configured to pass through a space between the insulating members 35, and the electrode lead 25 is coupled to the bus bar body 32 by welding after passing through a through-hole 33 formed in the bus bar body 32. Therefore, the bus bar body 32 and the electrode lead 25, exposed outwardly of the pouch 11, should secure sufficient length.

As described above, significant loss may occur in the battery cell 10 according to the related art in the length direction of the battery cell 10 due to not only a sealing structure of the battery cell 10 itself, but also a structure in which the electrode lead 25 is welded to the bas bar 31, a structure of the insulating member 35 interposed between the bus bar 31 and the battery cell 10, and the like.

In addition, the pouch-type battery cell 10 according to the related art may not have rigidity and may be easily deformed due to the pouch 11 being formed of a flexible material. Moreover, an irregular shape may be formed on a bottom surface of the pouch 11 during preparation of the battery cell 10, resulting in poor heat conduction between the bottom surface of the pouch 11 and a counter component (for example, a housing).

SUMMARY OF THE INVENTION

An aspect of the present disclosure is to provide a battery cell having improving energy density per unit volume, as compared with a pouch-type battery cell according to the related art.

An aspect of the present disclosure is to provide a battery cell having strength and stability secured therein.

An aspect of the present disclosure is to provide a battery cell into which an electrolyte is easily injected, and the electrolyte may be charged.

An aspect of the present disclosure is to provide a battery cell for easily exhausting gas from inside a casing.

An aspect of the present disclosure is to provide a battery cell for easily managing a long, flexible electrode assembly.

An aspect of the present disclosure is to provide a battery cell having decreased internal resistance.

An aspect of the present disclosure is to provide a battery cell having improved cooling performance, and a battery module and a battery pack including the same.

An aspect of the present disclosure is to provide a battery cell allowing an electrical connection between a plurality of battery cells to be easily provided and having a simple electrical connection structure, and a battery module and a battery pack including the same.

Another aspect of the present disclosure is to provide a battery cell of which voltage and temperature are easily sensed, and a battery module and a battery pack including the same.

According to an aspect of the present disclosure, a battery cell includes: a casing having an accommodation space formed therein and having one or both ends open; a cover plate covering one or both open ends of the casing; an electrode assembly accommodated in the accommodation space, in which a plurality of electrode plates are stacked with a separator interposed therebetween, the electrode assembly including electrode connection portions, respectively extending from the plurality of electrode plates; and a terminal bonded to the electrode connection portion and having a portion exposed outwardly through the cover plate.

The terminal may include a bonding portion, bonded to the electrode connection portion, and a terminal body electrically connected to the bonding portion and exposed outwardly through the cover plate.

The electrode connection portion and the bonding portion may be bonded to each other while overlapping each other in a length direction of the casing. The electrode connection portion and the bonding portion may be bonded to each other while an end surface of the electrode connection portion is in contact with the terminal body. The terminal may have an L-shaped, T-shaped, or U-shaped cross-sectional profile.

The terminal may have a plurality of bonding portions extend from the terminal body at a predetermined gap. The plurality of bonding portions may be configured to be in contact with both side surfaces of the electrode connection portion. The electrode connection portion and the plurality of bonding portion may be bonded to each other while overlapping each other in a length direction of the casing.

The electrode connection portion and the bonding portion may be bonded to each other while overlapping each other, and at least one of the bonding portion and the electrode connection portion may then be bent at least once.

The electrode connection portion may extend from a center of the electrode assembly, based on a thickness direction of the electrode assembly, or may extend in a position offset from the center of the electrode assembly in the thickness direction. The electrode connection portion may extend from an external portion of the electrode assembly, in a length direction of the electrode assembly, and the electrode connection portion may be bent in a thickness direction of the electrode assembly.

The battery cell may further include: a packaging member surrounding a periphery of the electrode assembly in a length direction. In this case, the packaging member may include a film or a tube formed of a material having at least one of heat shrinkage and insulating properties.

The electrode connection portion and the terminal may be bonded to each other by welding.

A length of the electrode plate may be equal to more than twice to less than 25 times a height of the electrode plate. In this case, the electrode plate may have a length of 400 mm or more to 2000 mm or less, a length of 600 mm or more to 1800 mm or less, or a length of 1000 mm or more to 1500 mm or less.

The terminal body may have a thickness greater than a thickness of the boding portion.

The terminal body may have a height greater than or equal to a height of the bonding portion.

In addition, the casing may have a structure in which a polygonal cross-section having a predetermined shape extends in the length direction. In this case, the casing may be formed of a metal or plastic, and may be formed by an extrusion process.

Both ends of the casing may be open, the cover plate may be coupled to each of both open ends of the casing, and the terminal may be exposed outwardly through the cover plate on both ends of the casing in a length direction.

The electrode connection portion may include a plurality of connection portions extending from each of both ends of the electrode plate in a length direction while the plurality of connection portions being spaced apart from each other, and the terminal may include a plurality of terminals exposed outwardly through the cover plate from each of both ends of the casing in the length direction.

The electrode connection portion may include two electrode connection portions, spaced apart from each other on one end of the electrode plate in a length direction, and two electrode connection portions spaced apart from each other on the other end of the electrode plate in the length direction. The terminal may includes two terminals, exposed outwardly through the cover plate while being spaced apart from each other on the one end of the casing in the length direction, and two terminals exposed outwardly through the cover plate while being spaced apart from each other on the other end of the casing in the length direction. The two terminals disposed on each of both ends of the casing in the length direction may have different polarities.

A gas discharging member for discharging gas, generated in the accommodation space of the casing, to an external entity may be installed on the cover plate.

An injection hole for injecting an electrolyte into the accommodation space of the casing may be formed in the cover plate, and may be clogged by a stopper member.

According to another aspect of the present disclosure, a battery module includes: a module housing having a space formed therein; a plurality of battery cells accommodated in the module housing; and a bus bar connecting terminals of the plurality of battery cells.

The bus bar may be connected to the terminal of the battery cell by one of welding, stationary fit coupling, screw coupling, nut and bolt coupling, hook coupling, and press-fit coupling.

According to another aspect of the present disclosure, a battery pack includes: a cell stack assembly in which a plurality of battery cells are stacked, the cell back assembly including a bus bar connected to terminals of the plurality of battery cells; and a pack housing having a spaced formed therein such that a plurality of cell stack assemblies are accommodated in the space. The plurality of cell stack assemblies are accommodated in the pack housing by regarding the cell stack assembly as a unit.

BRIEF DESCRIPTION OF DRAWINGS

The above and other aspects, features, and advantages of the present disclosure will be more clearly understood from the following detailed description, taken in conjunction with the accompanying drawings.

FIG. 15A is a cross-sectional view taken along line B-B' of FIG. 14, and FIG. 15B is a cross-sectional view of a battery cell provided with a single terminal disposed on one side of a casing in the same structure as illustrated in FIG. 15A.

DESCRIPTION OF THE INVENTION

Figure 1:
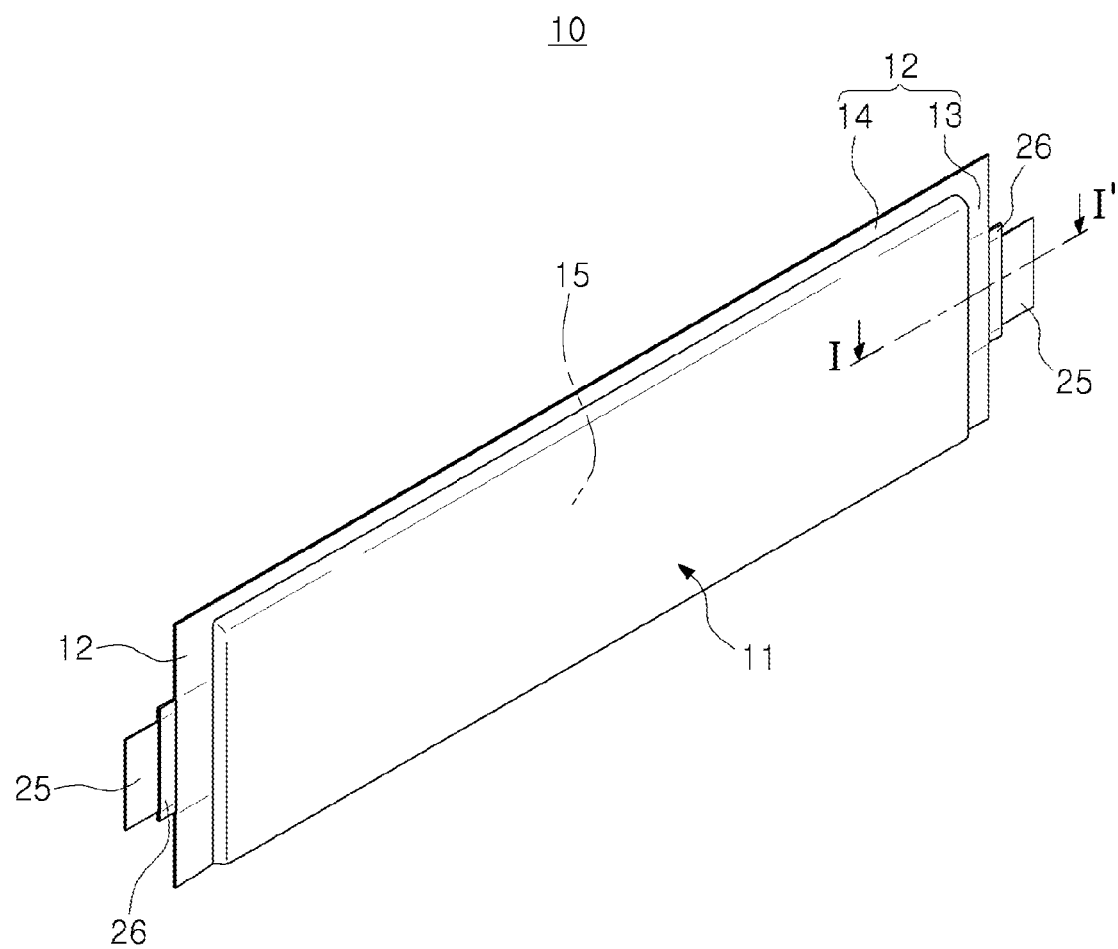
FIG. 1 is a perspective view of a pouch-type battery cell according to the related art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

Hereinafter, a battery cell 100 according to an exemplary embodiment will be described with reference to FIGS. 4 to 13.

Figure 4:
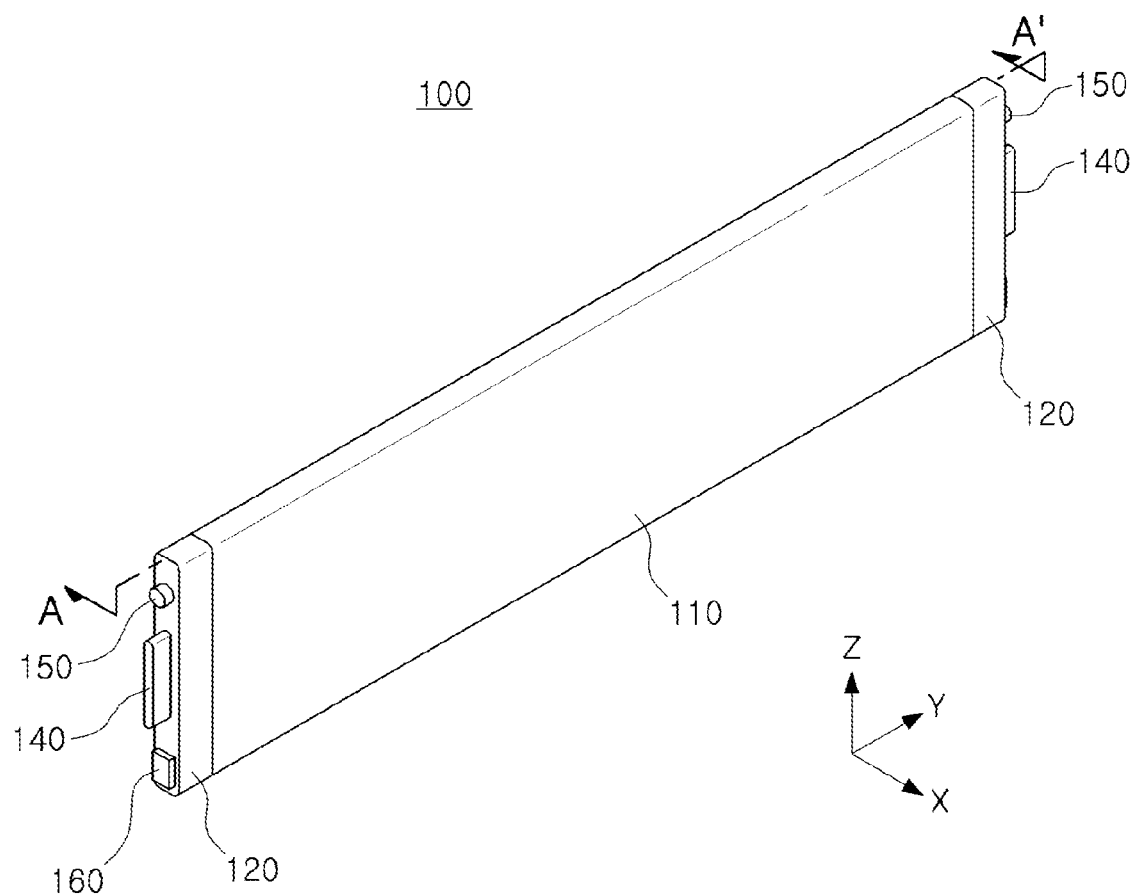
FIG. 4 is a perspective view of a battery cell according to an exemplary embodiment of the present disclosure.
Figure 5:
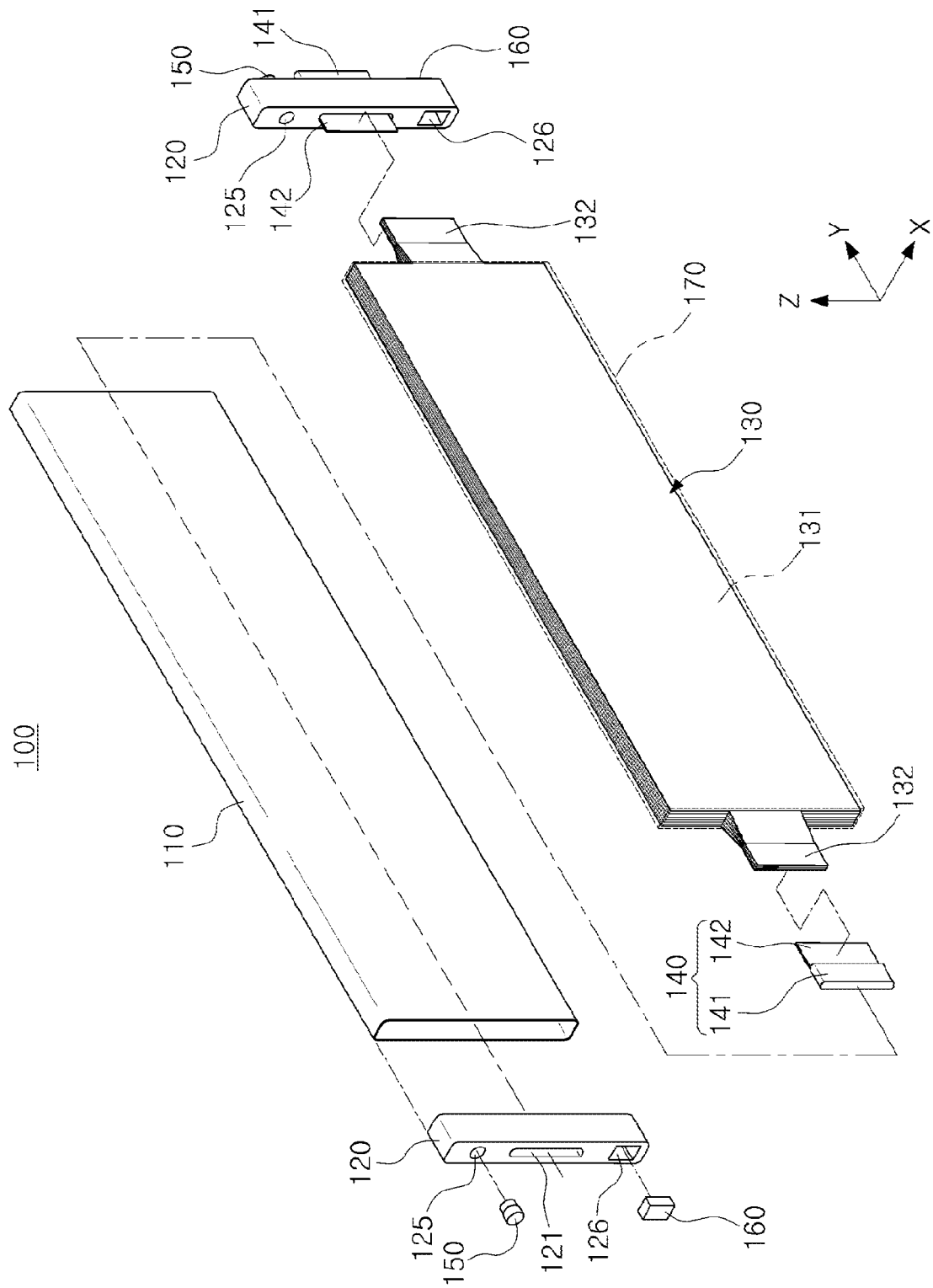
FIG. 5 is an exploded perspective view of the battery cell illustrated in FIG. 4.
Figure 6:
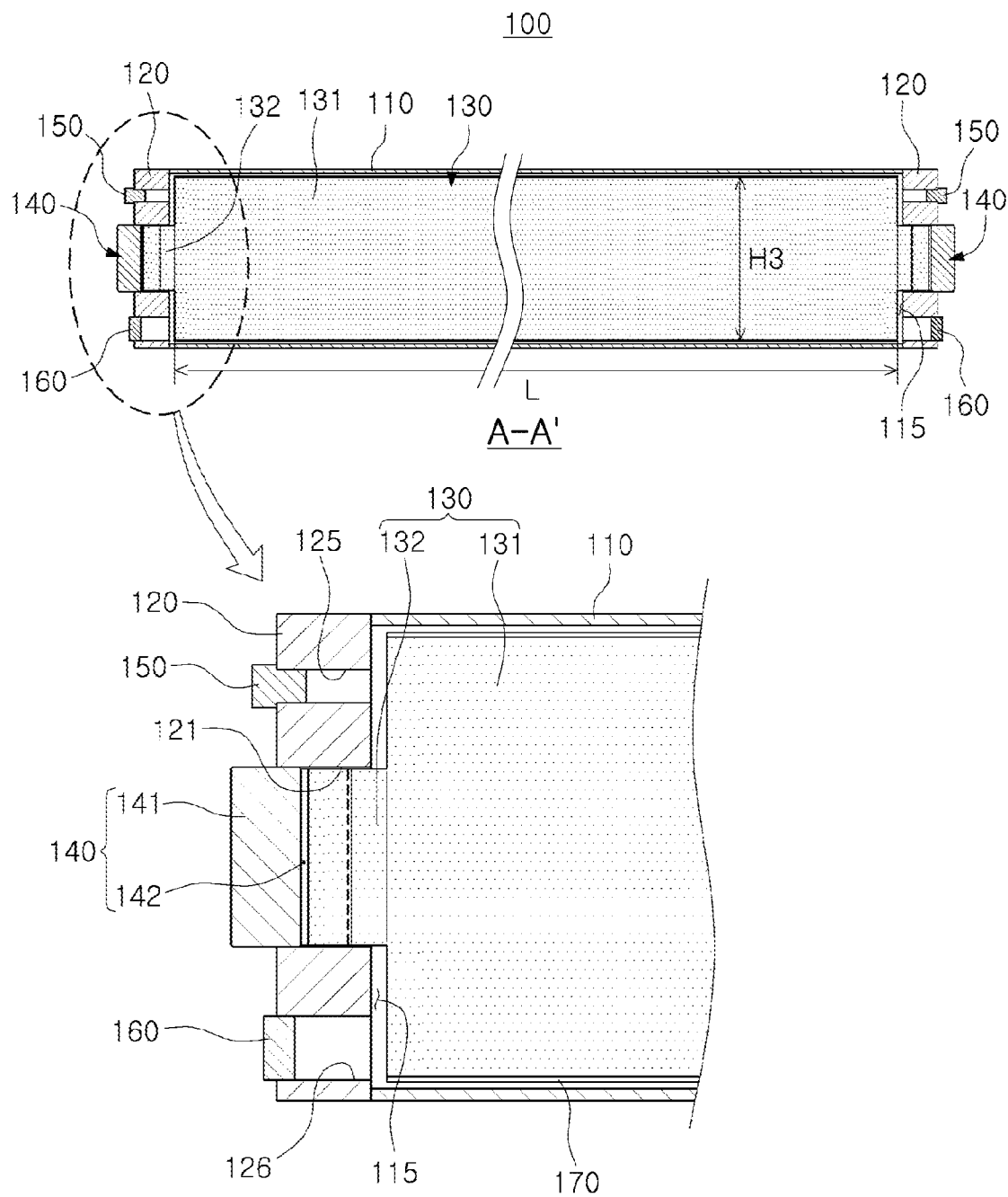
FIG. 6 is a cross-sectional view taken along line A-A' of FIG. 4.
Figure 7:
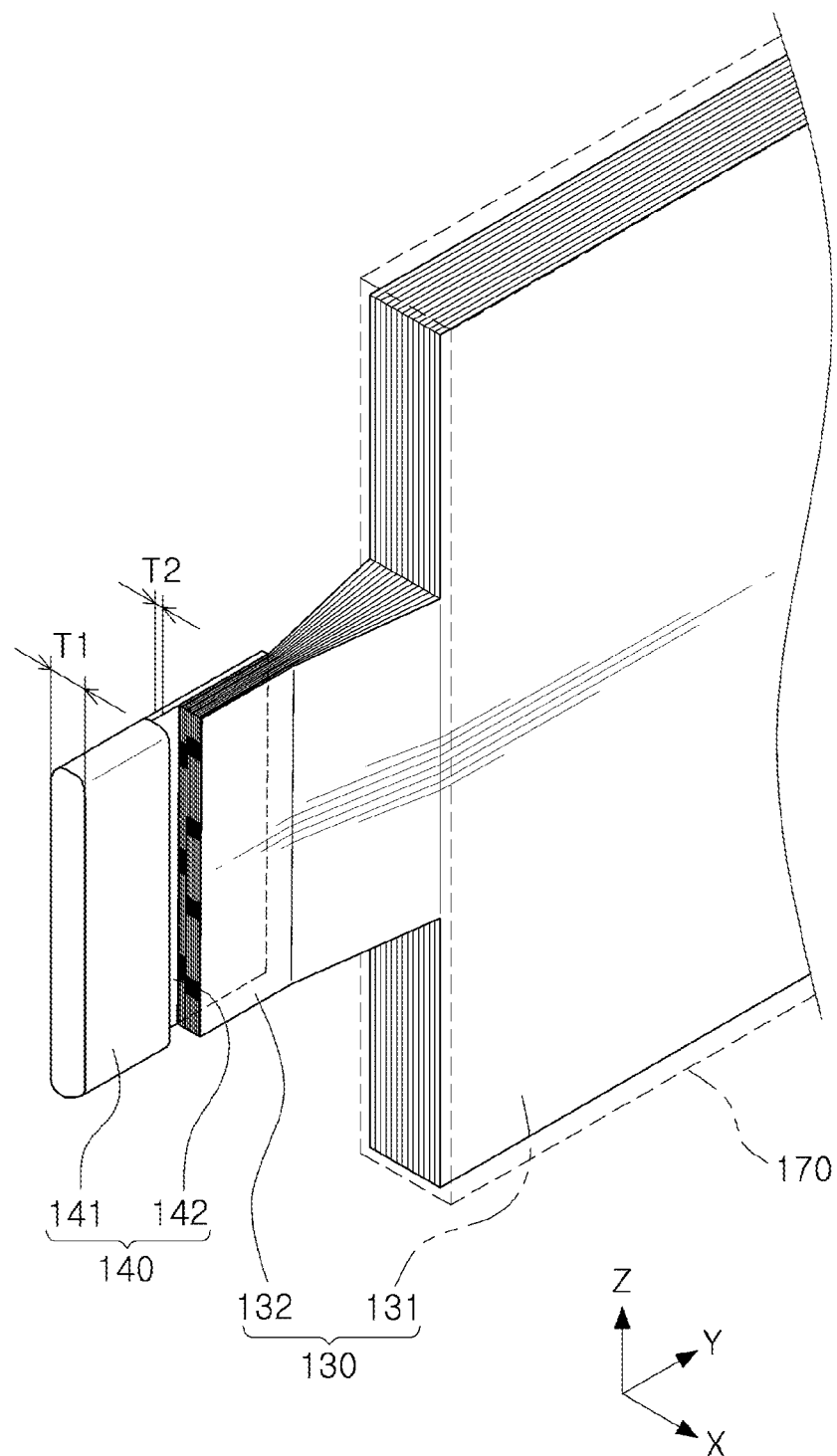
FIG. 7 is a perspective view illustrating an example of the state in which a terminal and an electrode assembly illustrated in FIG. 5 are bonded to each other.
Figure 11:
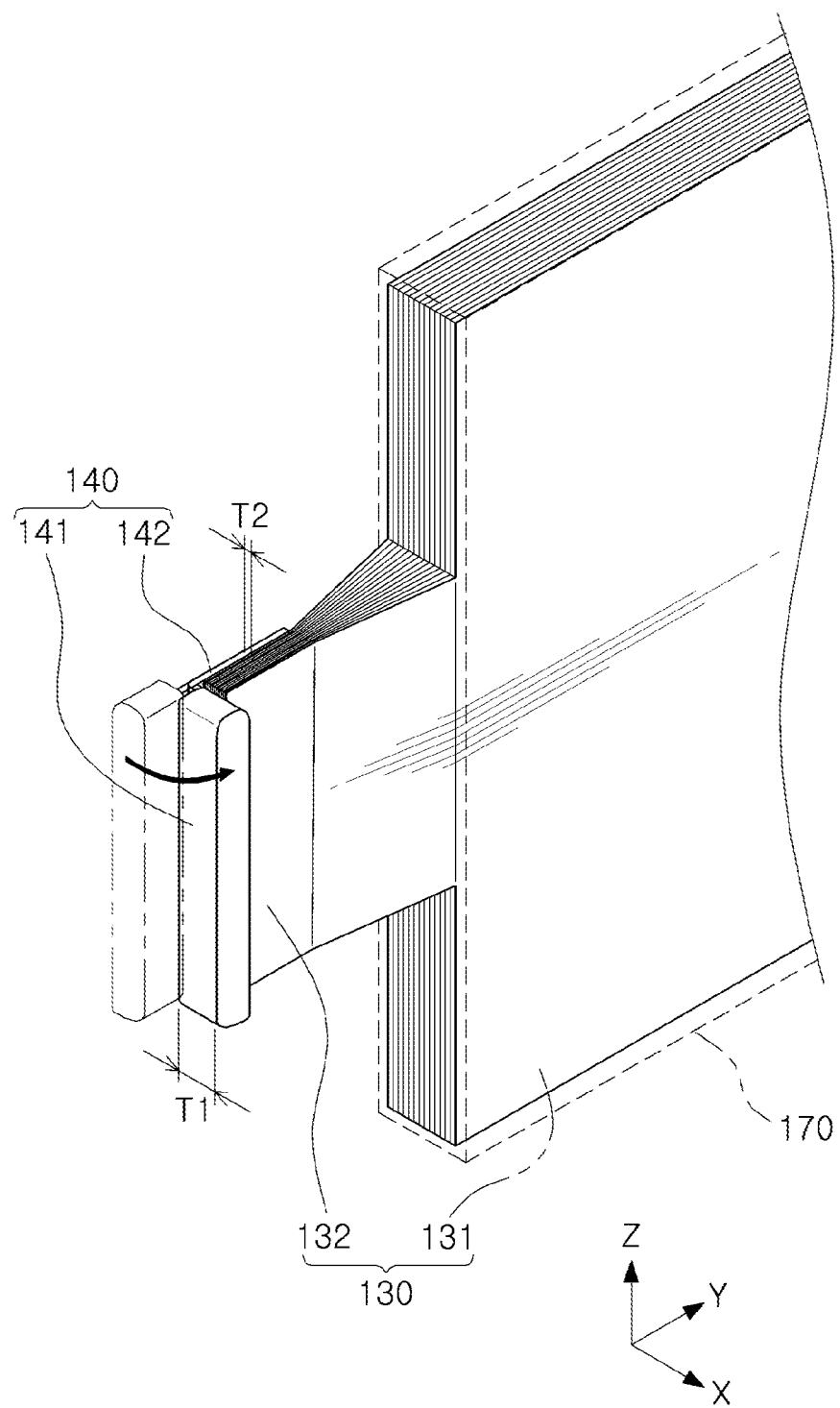
Figure 12A:
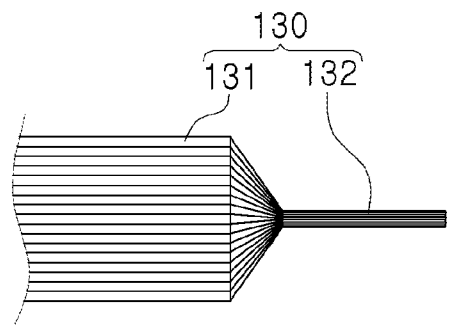
FIGS. 12A to 12D are schematic views illustrating various positions of an electrode connection portion in an electrode assembly according to an exemplary embodiment of the present disclosure.
Figure 12B:
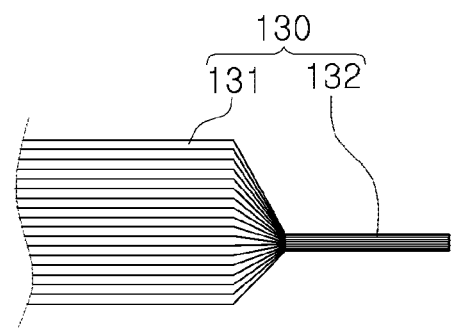
Figure 12C:
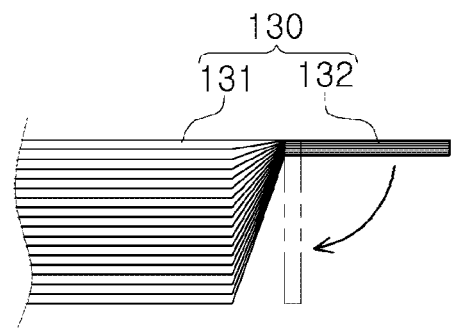
Figure 12D:
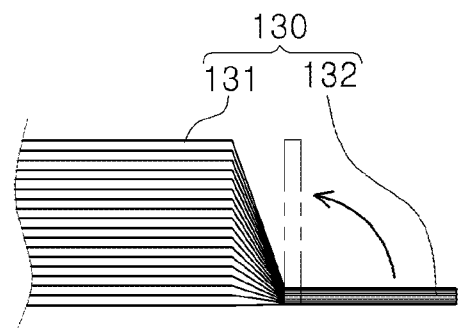
Figure 13:
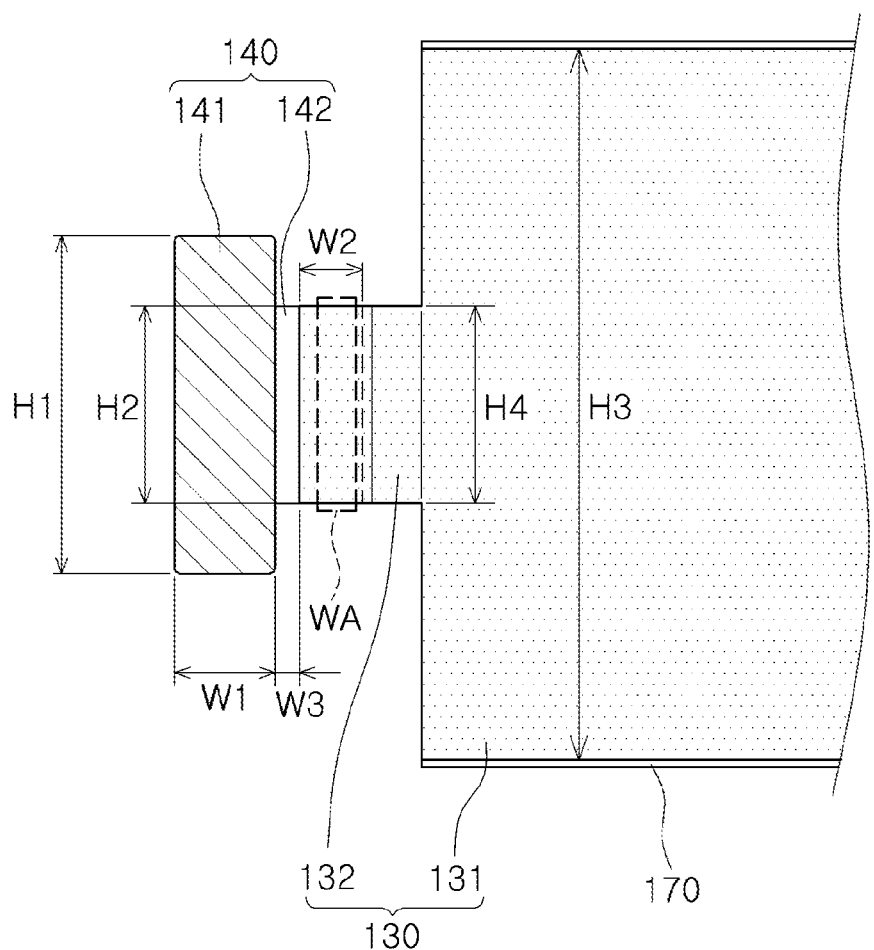
FIG. 13 is a schematic view illustrating the state in which a terminal and an electrode assembly according to an exemplary embodiment of the present disclosure are bonded to each other.

FIG. 4 is a perspective view of a battery cell 100 according to an exemplary embodiment, FIG. 5 is an exploded perspective view of the battery cell 100 illustrated in FIG. 4, FIG. 6 is a cross-sectional view taken along line A-A' of FIG. 4, FIG. 7 is a perspective view illustrating an example of the state in which a terminal 140 and an electrode assembly 130 illustrated in FIG. 5 are bonded to each other, FIGS. 8 to 11 are perspective views illustrating a modified example of the state in which a terminal 140 and an electrode assembly 130 illustrated in FIG. 7 are bonded to each other, FIGS. 12A to 12D are a schematic view illustrating various positions of an electrode connection portion 132 in an electrode assembly 130 according to an exemplary embodiment, and FIG. 13 is a schematic view illustrating the state in which a terminal 140 and an electrode assembly 130 according to an exemplary embodiment are bonded to each other.

Referring to FIGS. 4 to 6, a battery cell 100 according to an exemplary embodiment may include a casing 110 having rigidity, a cover plate 120, an electrode assembly 130, and a terminal 140. The battery cell 100 may further include at least some of a gas discharging member 150, a stopper member 160, and a packaging member 170.

The battery cell 100 may be configured as a battery cell having a long width structure having a length (a width) (a Y direction) greater than a height (a Z direction). For example, the battery cell 100 may have a sufficient length of 400 mm or more to 2000 mm or less.

The casing 110 may have an accommodation space 115 having a predetermined size therein, and may be configured to accommodate the electrode assembly 130 and the electrolyte (not illustrated) in the accommodation space 115.

The casing 110 may be configured to have rigidity. In addition, the casing 110 may have a thickness enough to prevent the casing 110 from being easily deformed by external force. In the specification and claims, the phrase "the casing 110 having rigidity" means that the casing 110 has an inflexible material, a thickness, or a shape to prevent the casing 110 from being easily deformed by external force, unlike the pouch 11 provided in the pouch-type battery cell 10 according to the related art.

As described above, according to an exemplary embodiment, strength of the battery cell 110 may be secured using the casing 110 having rigidity to prevent the casing from easily deformed, as compared with the related art using a pouch of a flexible material. In addition, the casing 110 may be sufficiently resistant to a swelling phenomenon, so that stability of the battery cell 110 may be secured.

In addition, the casing 110 may be formed of a thermally conductive material such that heat, generated inside the casing 110, is dissipated outwardly of the casing 110. For example, the casing 110 may be formed of a metal, such as aluminum, or plastic having high thermal conductivity.

The casing 110 may be in the form of a pipe having a constant cross-sectional shape along the length direction Y. For example, the casing 110 may have a structure in which a polygonal cross-section having a predetermined shape extends in the length direction Y. For example, the casing 110 may have a polygonal pipe structure having a rectangular cross-section in a thickness direction X and a height direction Z. As described above, when the casing 110 has a predetermined cross-sectional shape, the casing 110 may be manufactured by an extrusion process. When the casing 110 is manufactured by an extrusion process, there is an advantage in easily manufacturing the casing 110. However, a method of manufacturing the casing 110 is not limited to the extrusion process, and the casing 110 may be manufactured by other known manufacturing methods.

As described above, when the casing 110 has a polygonal cross-section, an external surface of the casing 110 is flat, so that a contact area between a counter component (for example, a water-cooled cooling member in which a cooling path is formed) and the casing 110 may be sufficiently secured. As a result, heat dissipation and cooling performance of the battery cell 100 may be sufficiently secured.

In addition, the casing 110 may have a pipe shape in which both ends are open in the length direction Y, as illustrated in FIGS. 4 to 6, but may have a structure in which one end is closed and the other end is open. To provide a casing 110 having one end closed, a separate plate is bonded to one end of a casing 110, having both ends open, by welding or the like, but a manufacturing method is not limited thereto.

The cover plate 120 may be configured to cover one open end open end or both open ends of the casing 110. For example, when both ends of the casing 110 are open, the cover plate 120 may be installed on both ends of the casing 110. In addition, when one end of the casing 110 is open, the cover plate 120 may be installed on only one end of the casing 110.

The cover plate 120 may be formed of an insulating material because the terminal 140, through which electricity flows, is a portion exposed outwardly, as will be described later. Alternatively, an insulating material may be coated on an external surface of the cover plate 120 of a conductive material, or only a region adjacent to the terminal 140 may be formed of an insulating material. In addition, when an insulating structure is formed in a coupling portion of the cover plate 120 and the terminal 140, the cover plate 120 may be formed of a metal.

To couple the cover plate 120 and the casing 110 to each other, a known fastening method such as fitting coupling may be used. A connection portion between the cover plate 120 and the casing 110 may be sealed to prevent electrolyte leakage through the connection portion between the cover plate 120 and the casing 110.

The electrode assembly 130 may be accommodated in the accommodation space 115 of the casing 110, and may have a structure in which a plurality of electrode plates 131 having a sheet shape are stacked with a separator (not illustrated) interposed therebetween. The electrode plate 131 may include a positive electrode plate and a negative electrode plate. The electrode assembly 130 may be configured in such a manner that a positive electrode plate and a negative electrode plate are stacked with a separator interposed therebetween while large surfaces of the positive electrode plate and the negative electrode plate face each other. The positive and negative electrode plates may be formed in a structure in which an active material slurry is applied to a current collector. In general, the slurry may be prepared by stirring a particulate active material, an auxiliary conductive material, a binder, a plasticizer, and the like with addition of a solvent. Since such a configuration of the electrode assembly 130 is a known structure, a detailed description of a stack structure of the positive electrode plate, the negative electrode plate, and the separator will be omitted.

The electrode assembly 130 may include an electrode connection portion 132 formed by extending a partial region outwardly from each of the electrode plates 131. In this case, the electrode connection portion 132 may include a positive electrode connection portion, extending from the positive electrode plate, and a negative electrode connection portion extending from the negative electrode plate. The electrode connection portion 132 may be a portion that is not coated (an uncoated portion), and may be bonded to a bonding portion 142 of the terminal 140 to be described later.

Referring to FIGS. 5 and 6, the electrode assembly 130 may have a structure in which the electrode connection portion 132 extends outwardly from one side and the other side of the electrode plate 131, forming a stacked state, in a length direction. In this case, the electrode connection portions 132 on the one side and the other side may each have a structure extending from the electrode plate 131 having the same polarity. For example, the electrode connection portion 132 on the one side may be configured as a positive electrode connection portion extending from the positive electrode plate, and the electrode connection portion 132 on the other side may be configured as a negative electrode connection portion extending from the negative electrode plate.

However, exemplary embodiments are not limited to the structure in which the electrode connection portion 132 extends from both sides of the electrode plate 131 in the length direction. For example, there may be a structure in which the electrode connection 132 extends outwardly from respective positive and negative electrode plates by giving a difference in heights of a positive connection portion and a negative connection portion on one side of the electrode plate 130 in a length direction (see FIG. 15). In this case, the terminal 140 to be described later may have a structure two terminals 140 are exposed outwardly from the cover plate 120 on one side.

The terminal 140 may be bonded to the electrode connection portion 132, and a portion of the terminal 140 may pass through the cover plate 120 to be exposed outwardly of the cover plate 120. The terminal 140 may include a bonding portion 142, bonded to the electrode connection portion 132, and a terminal body 141 electrically connected to the bonding portion 142 and exposed outwardly of the cover plate 120 through the cover plate 120.

Referring to FIGS. 5 to 13, the bonding portion 142 may have a structure overlapping the electrode connection portion 132, and may be bonded to at least a portion of an overlapping portion having a width (W2 of FIG. 13) to form a bonding area (WA of FIG. 13). The bonding area WA may be bonded by welding, and thus, the bonding portion 142 of the terminal 140 and the electrode connection portion 132 of the electrode assembly 130 may be electrically connected to each other.

Figure 8:
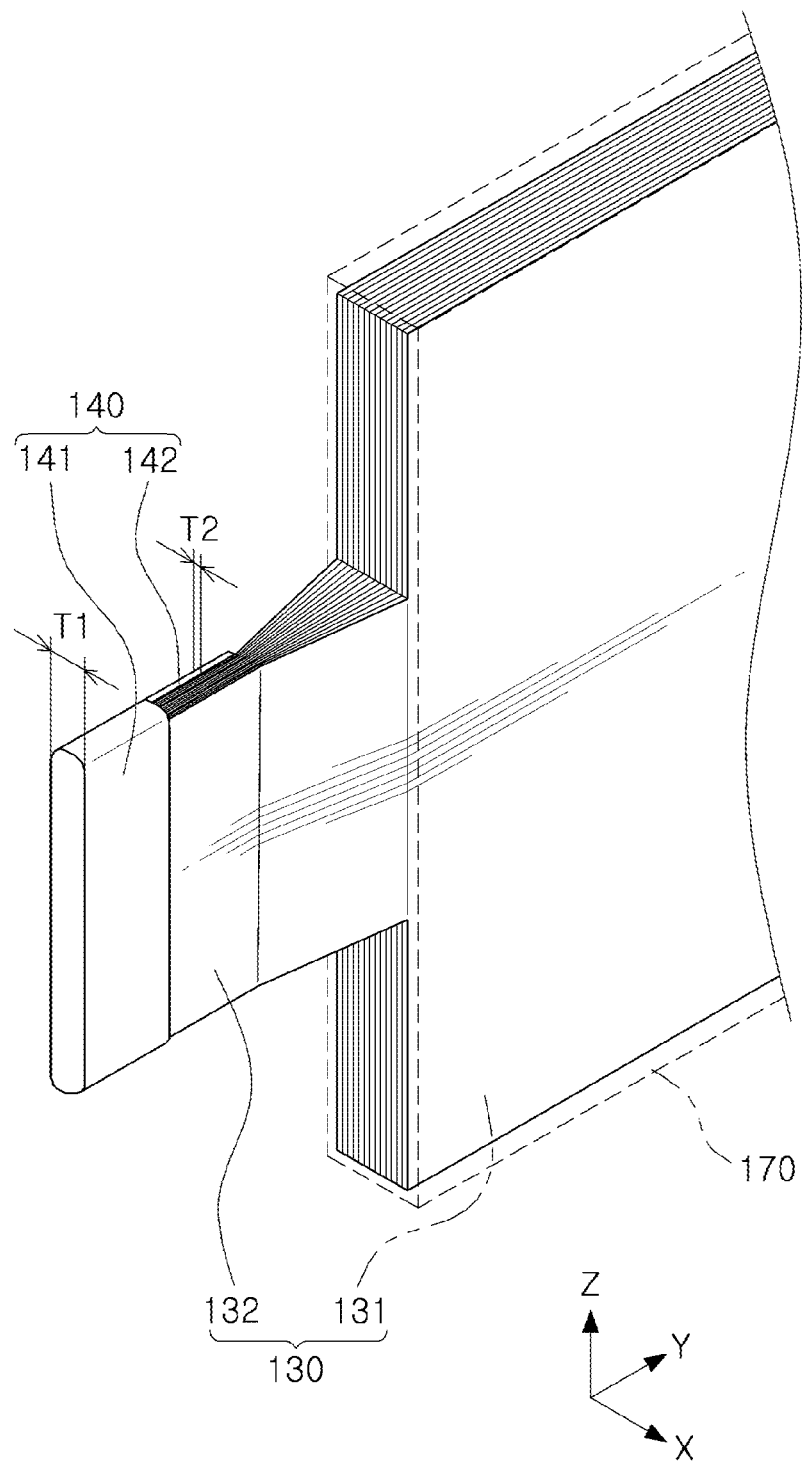
FIGS. 8 to 11 are perspective views illustrating a modified example of the state in which a terminal and an electrode assembly illustrated in FIG. 7 are bonded to each other.
Figure 9:
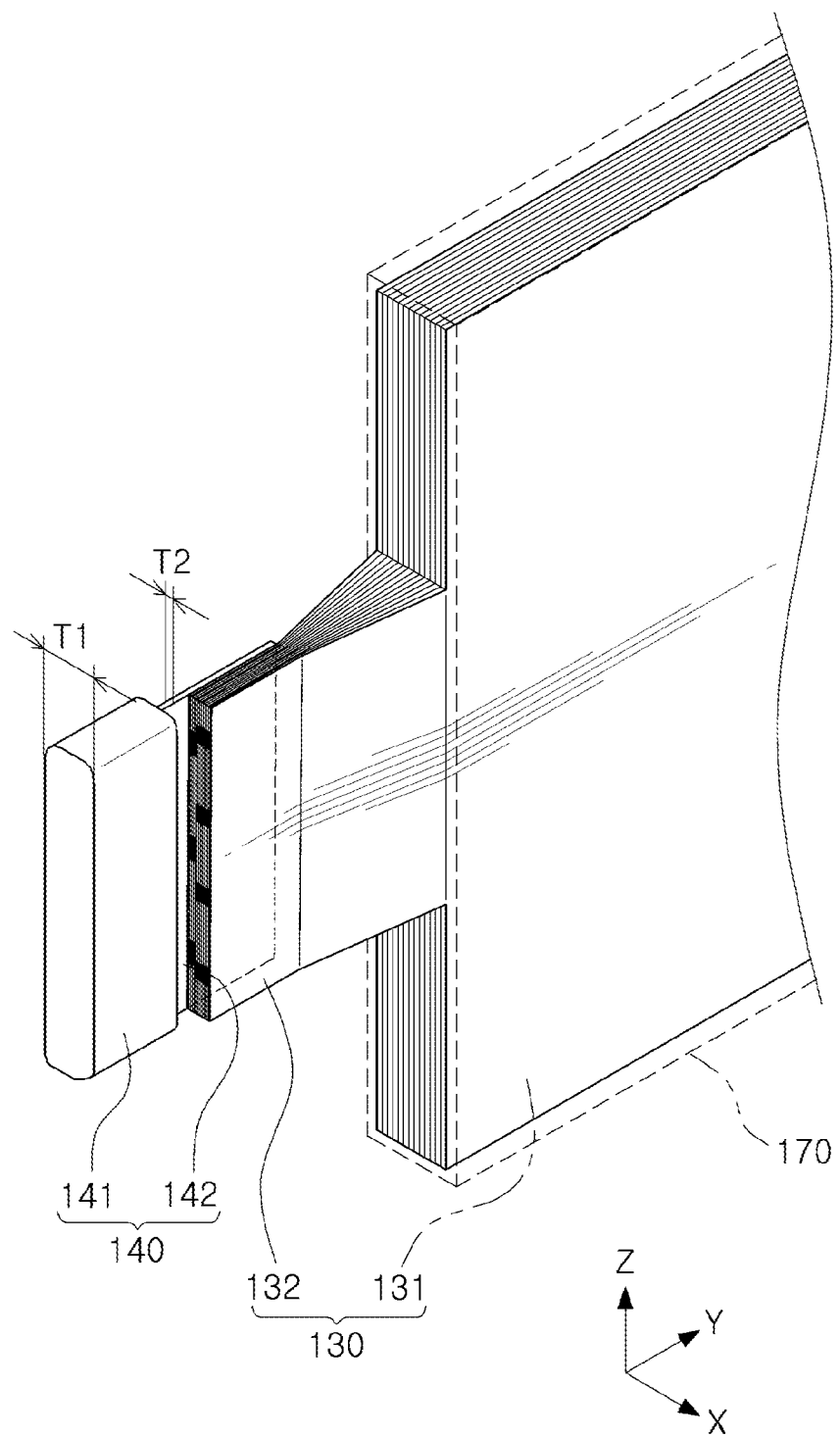

The terminal 140 may have an L-shaped or a T-shaped cross-sectional profile. For example, as illustrated in FIGS. 7 and 8, the bonding portion 142 may be connected to an external surface of the terminal body 141 in the thickness direction X, such that the terminal body 141 and the bonding portion 142 may form an 'L' shaped cross-sectional profile. In addition, as illustrated in FIG. 9, the bonding portion 142 may be connected to a central portion of the terminal body 141 in the thickness direction X, such that the terminal body 141 and the bonding portion 142 may form a 'T' shaped cross-sectional profile.

In this case, the electrode connection portion 132 and the bonding portion 142 may have a structure in which they are bonded to each other while overlapping each other in a length direction of the casing 110. As described above, since the electrode connection portion 132 and the bonding portion 142 are bonded to each other while overlapping each other, an electrical connection between the electrode assembly 130 and the terminal 140 may be reliably provided.

In addition, as illustrated in FIG. 8, the electrode connection portion 132 and the bonding portion 142 may also be bonded to each other in the state in which an end surface of the electrode connection portion 132 of the electrode assembly 130 is in contact with the terminal body 141 of the terminal 140. That is, FIG. 7 illustrates the case in which a distance (W3 in FIG. 13) between the terminal body 141 and an end portion of the electrode connection portion 132 has a predetermined gap, but as in the embodiment illustrated in FIG. 8, a gap (W3 in FIG. 13) may not be formed between the terminal body 141 and the end portion of the electrode connection portion 132. Accordingly, in the case of FIG. 8, space loss of a battery cell in the length direction may be further reduced, as compared with the case of FIG. 7. In addition, in the case of FIG. 8, since the end surface of the electrode connection portion 132 is in contact with the terminal body 141 of the terminal 140, a contact area between the electrode connection portion 132 of the electrode assembly 130 and the terminal 140 may be increased to reduce electrical resistance between the electrode connection portion 132 and the terminal 140.

Figure 10:
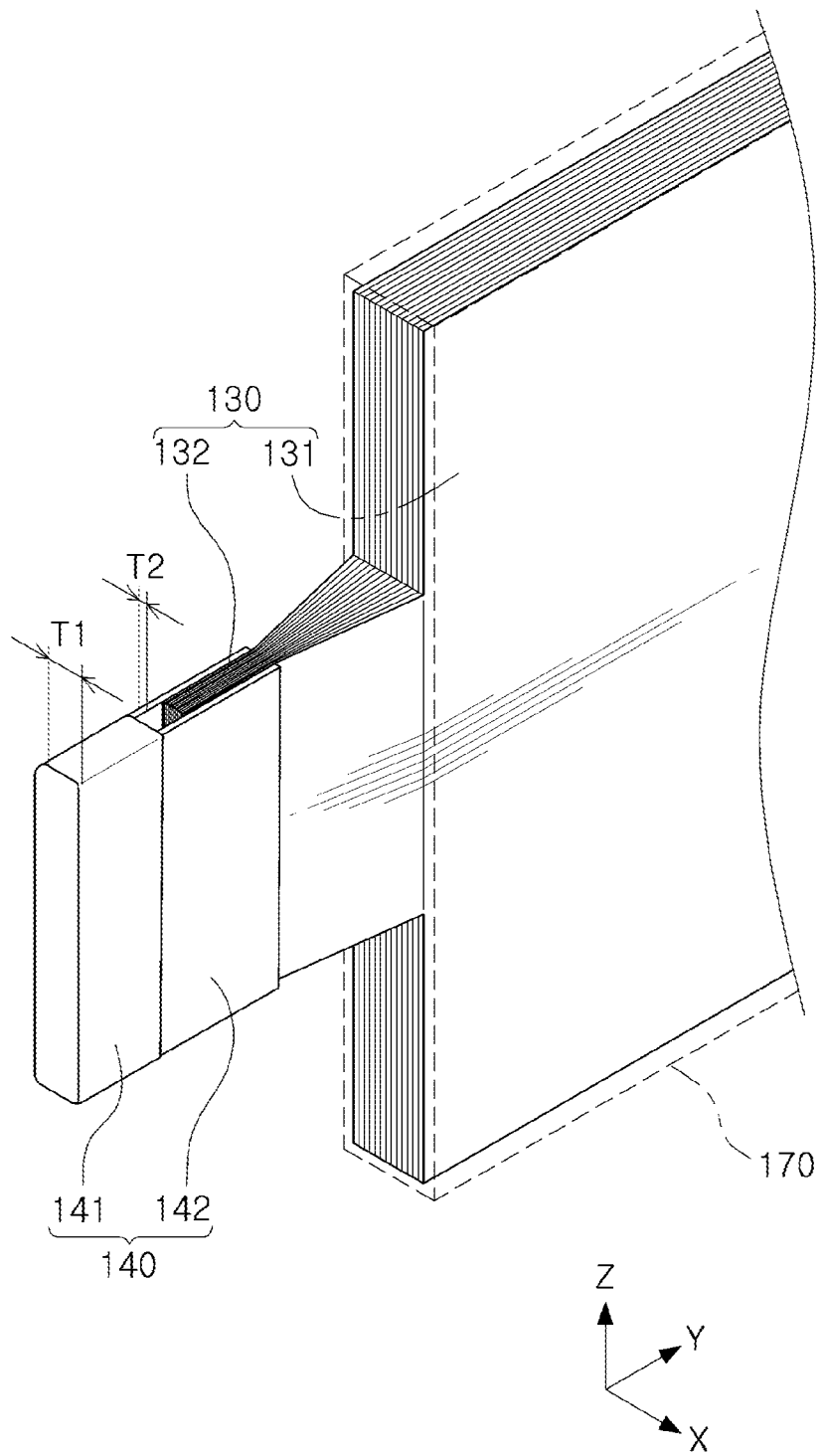

In addition, as illustrated in FIG. 10, the terminal 140 may have a structure in which a plurality of bonding portions 142 extend from the terminal body 141 at a predetermined interval, and the plurality of bonding portions 142 may be in contact with both sides of the electrode connection portion 132. That is, the terminal 140 may have a U-shaped (including a shape having angled corners) cross-sectional profile having a dent portion overall. In this case, the electrode connection portion 132 and the bonding portion 142 may be bonded to each other in the state in which the electrode connection portion 132 of the electrode assembly 130 are inserted into the dent portion formed between the plurality of bonding portions 142 of the terminal 140. According to the exemplary embodiment illustrated in FIG. 10, the bonding portion 142 of the terminal 140 may be bonded in a double-overlapping state on both sides of the electrode connection portion 132, so that bonding strength of a bonding portion may be improved. In addition, a double contact between the electrode connection portion 132 and the bonding portion 142 may result in an increase in a contact area between the electrode connection portion 132 and the terminal 140, so that an electrical resistance between the electrode connection portion 130 and the terminal 140 may be reduced. In FIG. 10, the gap (W3 of FIG. 13) is illustrated as being formed between the terminal body 141 and the end surface of the electrode connection portion 132. However, as illustrated in FIG. 8, the end surface of the electrode connection portion 132 may be in contact with the terminal body 141.

In addition, as illustrated in FIG. 11, after the electrode connection portion 132 and the bonding portion 142 are bonded to each other while overlapping each other, at least one of the bonding portion 142 and the electrode connection portion 132 may be bent at least once to reduce a length of the bonding portion. In FIG. 11, only the bonding portion 142 is illustrated as being bent. However, a portion in which the electrode connection portion 132 and the bonding portion 142 are bonded to each other may be bent at least once. In this case, a shape of the terminal body 141 and a position of the boding portion 142, connected to the terminal body 141, may be set in consideration of a thickness T1 of the terminal body 141 exposed outwardly of the cover plate 120.

Referring to FIGS. 12A to 12D, the electrode connection portion 132 may have a structure extending from a center of the electrode assembly 130 in the thickness direction, based on the thickness direction of the electrode assembly 132, or a structure extending in a position offset from one side of the electrode assembly 130 in the thickness direction.

For example, as illustrated in FIG. 12A, the electrode connection portion 132 may have a structure extending from a center of the electrode assembly 130, based on the thickness direction of the electrode assembly 130. In addition, as illustrated in FIGS. 12B to 12D, the electrode connection portion 132 may have a structure extending in a position offset from one side from a center of the electrode assembly 130 in the thickness direction. FIG. 12B illustrates a structure in which the electrode connection portion 132 extends in a point corresponding to about ⅓ of the electrode assembly 130 in the thickness direction, and FIGS. 12C and 12D illustrate a structure in which the electrode connection portion 132 extends from an external portion of the electrode assembly 130 in the thickness direction, in the length direction of the electrode assembly 130. In this case, FIG. 12C illustrates a structure in which an upper surface of the electrode connection portion 132 extends in a form having a height corresponding to an upper surface of the electrode plate 131, and FIG. 12D illustrates a structure in which a lower surface of the electrode plate 131 extends in a form having a height corresponding to a lower surface of the electrode plate 131.

In addition, as illustrated in FIGS. 12C and 12D, the electrode connection portion 132 may have a structure bent 90 degrees in the thickness direction of the electrode assembly 130. As described above, when the electrode connection portion 132 has a bent structure, a total length of the electrode assembly 130 may be reduced to improve energy density per unit volume of a battery cell. In addition, since the electrode connection portion 132 and the electrode plate 131 are disposed in on the same plane, a jig for bonding the electrode assembly 130 and the terminal 140 to each other, or the like, may be easily installed to easily perform bonding and bending operations.

In the exemplary embodiment illustrated in FIGS. 12C and 12D, the electrode connection portion 132 may be bent 90 degrees in the thickness direction of the electrode assembly 130 in the state of being directly bonded to the terminal body 141 of the terminal 140, and the terminal 140 may be disposed on an external side of the electrode assembly 130 in the length direction in the bent state. As described above, when the electrode connection portion 132 is directly bonded to the terminal body 141, the terminal 140 may not include the bonding portion 142. In addition, a thickness and a shape of the terminal body 141 may be set in consideration of the thickness T1 of the terminal body 141 exposed outwardly of the cover plate 120. Alternatively, the electrode connection portion 132 may be bent 90 degrees in the thickness direction of the electrode assembly 130 after being bonded to the bonding portion 142 of the terminal 140. In addition, the bonding portion 142 may be bent once more such that the terminal body 141 is disposed on the external side of the electrode assembly 130 in the length direction, that is, the terminal body 141 is exposed outwardly of the cover plate 120.

As illustrated in FIGS. 7 to 11, the terminal 140 may have various cross-sectional profiles such as an L-shaped cross-sectional profile, a T-shaped cross-sectional profile, and a U-shaped cross-sectional profile, and the positions of the electrode connection portion 132 illustrated in 12A to 12D may be selected depending on the shape of the terminal 140. For example, in the case of the electrode connection portion 132 illustrated in FIG. 12A, it may be advantageous for installation of the terminal 140 having a T-shaped or U-shaped cross-sectional profile. However, such a case may be used to install the terminal 140 having another cross-sectional profile such as an L-shaped cross-sectional profile, or the like.

When forming a region in which the electrode connection portion 132 and the bonding portion 142 overlap each other, a height H4 of the electrode connection portion 132 and a height H2 of the bonding portion 142 may correspond (be similar) to each other.

The terminal body 141 may be electrically connected to the bonding portion 142. To this end, both the terminal body 141 and the bonding portion 142 may be formed of a conductive material. For example, the terminal body 141 and the joint portion 142 may be formed of a highly conductive metal such as aluminum or copper, but a material thereof may vary.

In addition, the terminal body 141 and the bonding portion 142 may be manufactured to be integrated. Alternatively, the terminal body 141 and the bonding portion 142 may be separately manufactured and then bonded by welding, or the like, to be integrated.

As illustrated in FIG. 5, when the electrode connection portion 132 has a structure in which the electrode connection portions 132 respectively extend outwardly from one side and the other side of the electrode plate 131 in the length direction, the terminal 140 may be bonded to each of the electrode connection portions 132 on both sides, and may then be exposed outwardly of the cover plate 120 from both ends of the casing 110 in a length direction.

Figure 2:
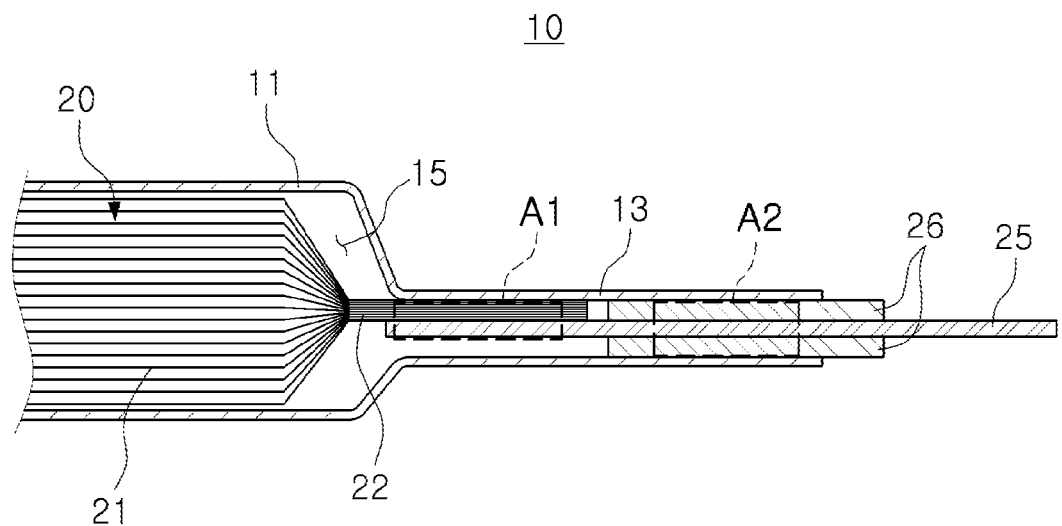
FIG. 2 is a cross-sectional view taken along line I-I' of FIG. 1.
Figure 3:
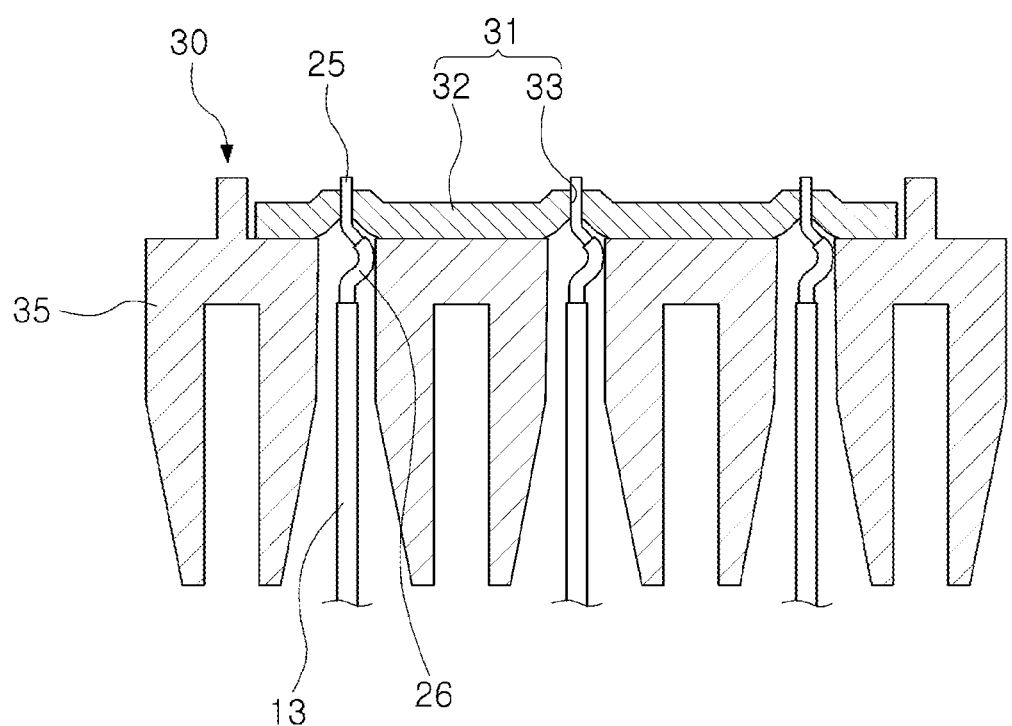
FIG. 3 is a cross-sectional view illustrating a state in which a plurality of battery cells are connected to a bus bar.

As described above, according to an exemplary embodiment, the electrode connection portion 132 of the electrode assembly 130 installed inside the casing 110 and the bonding portion 142 of the terminal 140 exposed to outwardly of the cover plate 120 are directly bonded to each other. Therefore, space loss in a length direction may be significantly reduced, as compared with the pouch-type battery cell 10 according to the related art. That is, as compared to the pouch-type battery cell 10 according to the related art illustrated in FIG. 2, the battery cell 100 according to an exemplary embodiment may be allowed to significantly reduce space loss in the length direction by removing a sealing area A2 in which a center of the sealing portion 26, the electrode lead 25, and the pouch 11 are sealed, and an insulating portion 26 exposed inwardly and outwardly of the sealing region A2. In addition, since the battery cell 100 according to an exemplary embodiment directly connects the terminal 140, exposed outwardly of the cover plate 120, to the electrode connection portion 132 of the electrode assembly 130, a length corresponding to the electrode lead 25 exposed outwardly of the pouch 11 in the pouch-type battery cell 10 may also be reduced.

Referring to FIG. 6, a length L of the electrode plate 6 may be at least twice a height (H3 of FIG. 13) of the electrode plate 131 such that a ratio of the volume occupied by the electrode plate 131 in a space inside the casing 110 is secured to be significantly high to improve energy density. That is, according to an exemplary embodiment, since the terminal 140 and the electrode assembly 130 are directly bonded to each other, space loss in a length direction may be significantly reduced, as compared with the related art. In addition, the length L of electrode plate 131 may be sufficiently large such that a ratio of a length for bonding the electrode connection portion 132 and the bonding portion 142 to an overall length of the casing 110 is significantly reduced.

In addition, the overall energy density in the battery module 200 or the battery pack 300 to be described later may be improved by increasing the length of the battery cell 100.

To this end, the length L of the electrode plate 131 may be equal to more than twice to less than 10 times the height H3 of the electrode plate 131. In the case of an ultra-long battery cell 100, a length L of an electrode plate 131 may be 2 to 25 times the height H3 of the electrode plate 131. That is, the length L of an electrode plate 131 may be equal to or more than twice the height H3 of the electrode plate 131 and may be equal to or less than 25 times the height H3 of the electrode plate 131. For example, when the height of the electrode plate 131 is 80 to 110 mm, the electrode plate 131 may have a length of 400 mm or more to 2000 mm or less. Also, the electrode plate 131 may have a length of 600 mm or more to 1800 mm or less. Also, the electrode plate 131 may have a length of 1000 mm or more to 1500 mm or less. However, example embodiments do not exclude the case in which the length L of the electrode plate 131 is less than twice the height H3 of the electrode plate 131.

Referring to FIGS. 7 to 11, a thickness T1 of the terminal body 141 exposed outwardly of the cover plate 120 may be greater than a thickness T2 of the bonding portion 142. In addition, as illustrated in FIG. 13, the terminal body 141 may be configured to have a height H1 greater than or equal to a height H2 of the bonding portion 142. As described above, by increasing at least one of the thickness T1 and the height H1 of the terminal body 141 exposed outwardly of the cover plate 120, the terminal body 141 of the terminal 140 may be exposed outwardly of the casing 110 in a large area.

Accordingly, heat generated inside the battery cell 100 may be easily dissipated outwardly of the battery cell 100. In addition, an electrical connection between the plurality of battery cells 100 may be easily performed through a contact between the terminal 140 and a bus bar (see 260 of FIG. 18), and a simple electrical connection structure may be implemented. Unlike the pouch-type battery cell 10 according to the related art, welding is not necessarily required to bond the battery cell 100 and a bus bar (260 in FIG. 18). Instead of welding, a non-welding bonding method, for example, stationary fit coupling, screw coupling, nut and bolt coupling, hook coupling, press-fit coupling, or the like, may be used. As described above, when the non-welding bonding method is used, electrical resistance caused by welding may be reduced and an overall lifespan of the battery cell 100 may be increased. In addition, since the terminal 140 is exposed outwardly of the casing 110 in a large area, a voltage/temperature sensing structure of an individual battery cell 100 may be easily implemented.

A terminal through-hole 121 may be formed in the cover plate 120 so that the terminal body 141 may be exposed outwardly of the cover plate 120. The thickness T1 and the height H1 of the terminal body 141, exposed outwardly of the cover plate 120, may have sizes corresponding to an internal surface of the terminal through-hole 121. In addition, a sealing means such as a gasket (not illustrated) or a sealing member may be interposed between the terminal through-hole 121 and the terminal body 141 to prevent electrolyte leakage through a coupling portion between the terminal 140 and the cover plate 120. In addition, the terminal body 141 may be configured to have a sufficient width W1 to maintain the state, in which the terminal body 141 is supported in the terminal through-hole 121, and to install the sealing means.

The battery cell 100 according to an exemplary embodiment may further include a packaging member 170 surrounding a periphery of the electrode assembly 130 in a length direction Y. The packaging member 170 may have a shape surrounding an entire length of the electrode plate 131 in a length direction Y, but may have a structure surrounding the electrode plate 131 except for a portion of the entire length.

The electrode assembly 130, in which the thin electrode plate 131 and the separator are stacked, may have a flexible structure and may be easily bent or deformed, and the stack structure thereof may be easily disturbed. Since the electrode assembly 130 has a large length of 400 mm or more to 2000 mm or less, the battery cell 100 according to an embodiment may be more easily bent or deformed than when the electrode assembly 130 has a small length, so that it may difficult to handle or manage the electrode assembly 130. However, according to an exemplary embodiment, since the packaging member 170 surrounds the periphery of the electrode assembly 130 in the length direction Y, a shape of the electrode assembly 130 may be maintained, and a process of inserting the electrode assembly 130 having a large length into an accommodation space 115 of the casing 110 may be smoothly performed. The packaging member 170 may be a film formed of a heat-shrinkable material, and may be configured such that the periphery of the electrode assembly 130 in the length direction is wound or the electrode assembly 130 is inserted into a tube formed of a heat-shrinkable material and having a larger accommodation space than the electrode assembly 130, and then the packaging member 170 formed of a heat-shrinkable material presses an external surface of the electrode assembly 130 through heating. As described above, the packaging member 170 formed of a heat-shrinkable material may be used to easily perform an operation of installing the packaging member 170 on the electrode assembly 130. The packaging member 170 may be, for example, a polymer such as PET.

In addition, the packaging member 170 may be formed of an insulating material. In this case, insulating performance between the electrode assembly 130 and the casing 110 may be improved.

A venting hole 125 for discharging gas generated in the accommodation space 115 of the casing 110 to an external entity may be formed in the cover plate 120, and a gas discharging member 150 may be installed to communicate with the venting hole 125.

In the accommodation space 115 of the battery cell 100, gas may be generated by an electrochemical reaction between the electrode plate 131 and the electrolyte. According to an exemplary embodiment, the gas generated in the accommodation space 115 may be easily discharged to an external entity through the gas discharging member 150 to secure stability of the battery cell 100.

The gas discharging member 150 may use a known structure, shape, or material for discharging gas to an external entity or preventing an electrolyte, contained in the accommodation space 115, from being discharged or leaked to the external entity. For example, a waterproof breathable film (for example, a polytetrafluoroethylene film, polyurethane film, or the like) or nonwoven fabric may be used, and a mechanical structure such as a valve may be applied.

An injection hole 126 for injecting an electrolyte into the accommodation space 115 may be formed in the cover plate 120, and may be clogged by the stopper member 160. Due to such a configuration of the injection hole 126 and the stopper member 160, the electrolyte may be easily injected and may be additionally charged after initial charging of the electrolyte. Thus, lifespan of the battery cell 110 may be increased.

In FIGS. 4 to 6, the gas discharging member 150 for discharging gas, the injection hole 126 for injecting an electrolyte, and a stopper member 160 are illustrated as being provided in each of the cover plates 120 installed on both ends of the casing 110. However, at least one of the gas discharging member 150 and the stopper member 160 may be provided in only one of the cover plates 120 on both sides of the casing 110.

Next, a battery cell 100 according to another exemplary embodiment will be described with reference to FIGS. 14 to 16.

Figure 14:
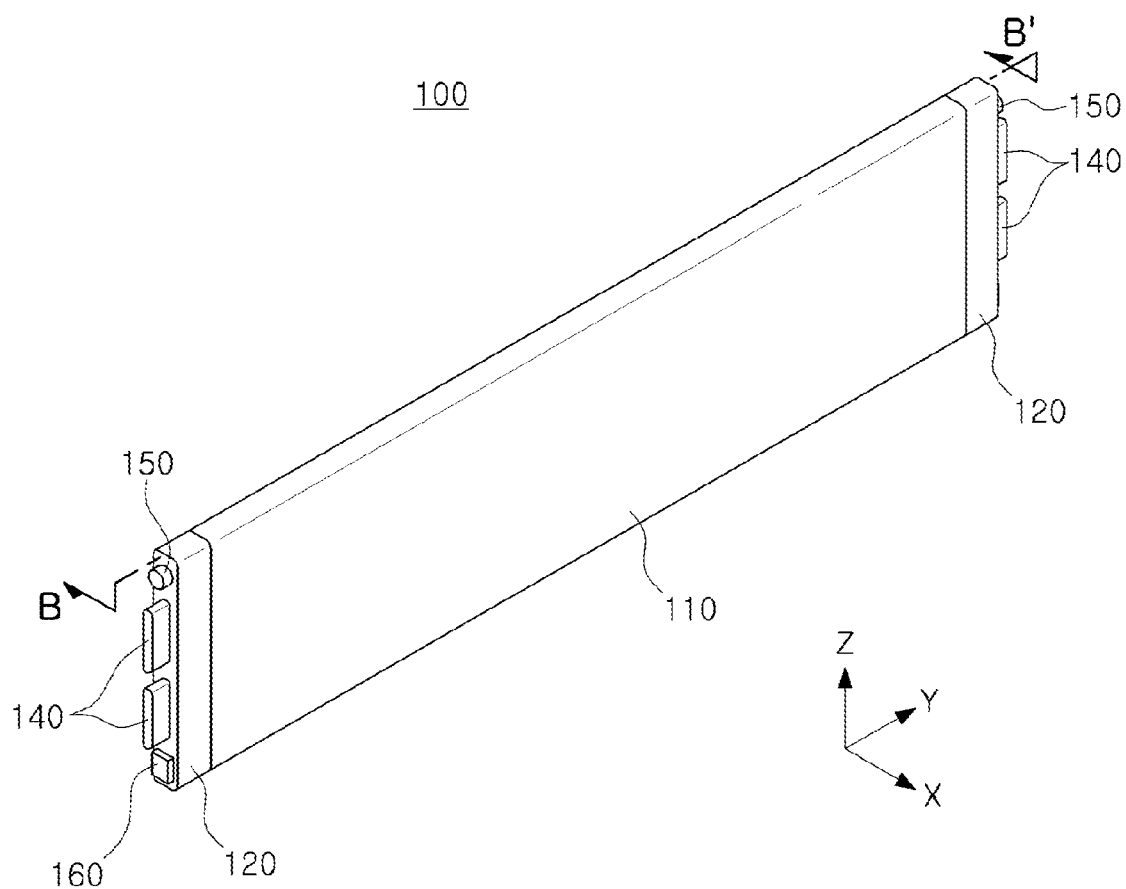
FIG. 14 is a perspective view of a battery cell according to another exemplary embodiment of the present disclosure.
Figure 15A:
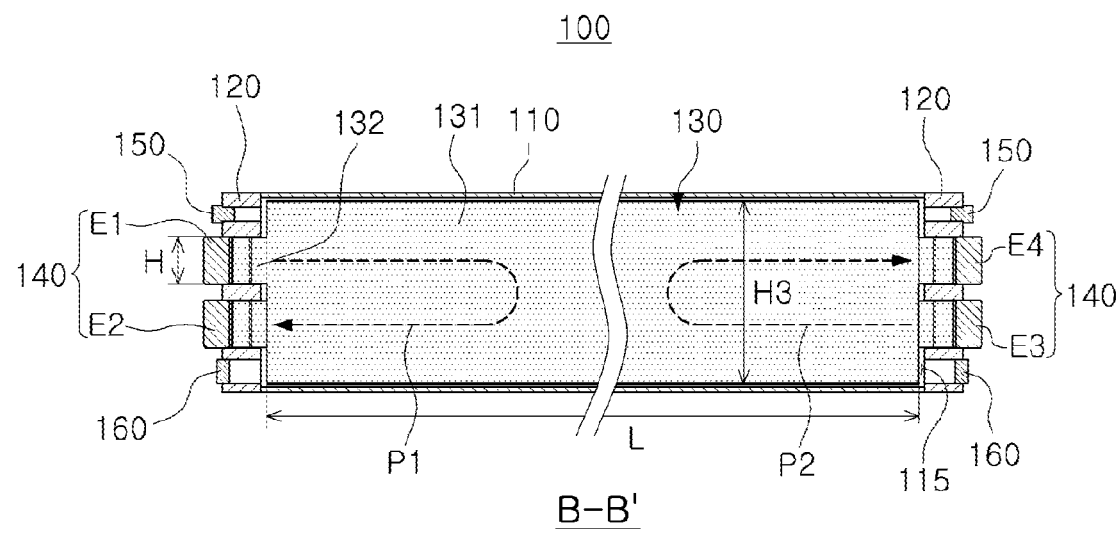
FIGS. 15A and 15B are cross-sectional views illustrating a comparison between the battery cell illustrated in FIG. 14 and a battery cell provided with a single terminal disposed on one side.
Figure 15B:
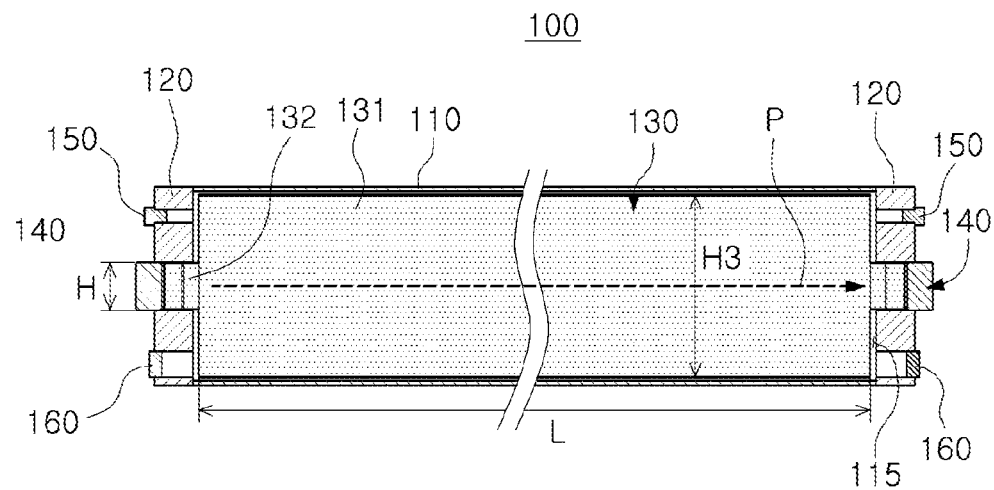

FIG. 14 is a perspective view of a battery cell 100 according to another exemplary embodiment. FIGS. 15A and 15B are cross-sectional views illustrating a comparison between the battery cell 100 illustrated in FIG. 14 and a battery cell 100 provided with a single terminal 140 disposed on one side. FIG. 15A is a cross-sectional view taken along line B-B' of FIG. 14, and FIG. 15B is a cross-sectional view of a battery cell provided with a single terminal 140 disposed on one side of a casing 110 in the same structure as illustrated in FIG. 15A. FIG. 16 is a schematic view illustrating an example of a terminal connection structure of the battery cell 100 illustrated in FIG. 14.

The battery cell 100 illustrated in FIGS. 14 and 15A may include a casing 110 having rigidity, a cover plate 120, an electrode assembly 130, and terminal 140, similarly to the battery cell 100 described with reference to FIGS. 4 to 13. The battery cell 100 may further include at least some of the gas discharging member 150, a stopper member 160, and a packaging member 170. The battery cell 100 illustrated in FIG. 14 is only different from the battery cell 100 described with reference to FIGS. 4 to 13, in that a plurality of terminals 140 may be provided on both ends of the casing 110 in a length direction and a plurality of electrode connection portions 132, corresponding to the plurality of terminals 140, may be provided on both ends of the electrode assembly 130. Therefore, detailed description of the same or similar configuration as the battery cell 100 described with reference to FIGS. 4 to 13 will be replaced with the above description, and configurations of the electrode assembly 130 and the terminal 140 will be mainly described.

Figure 16:
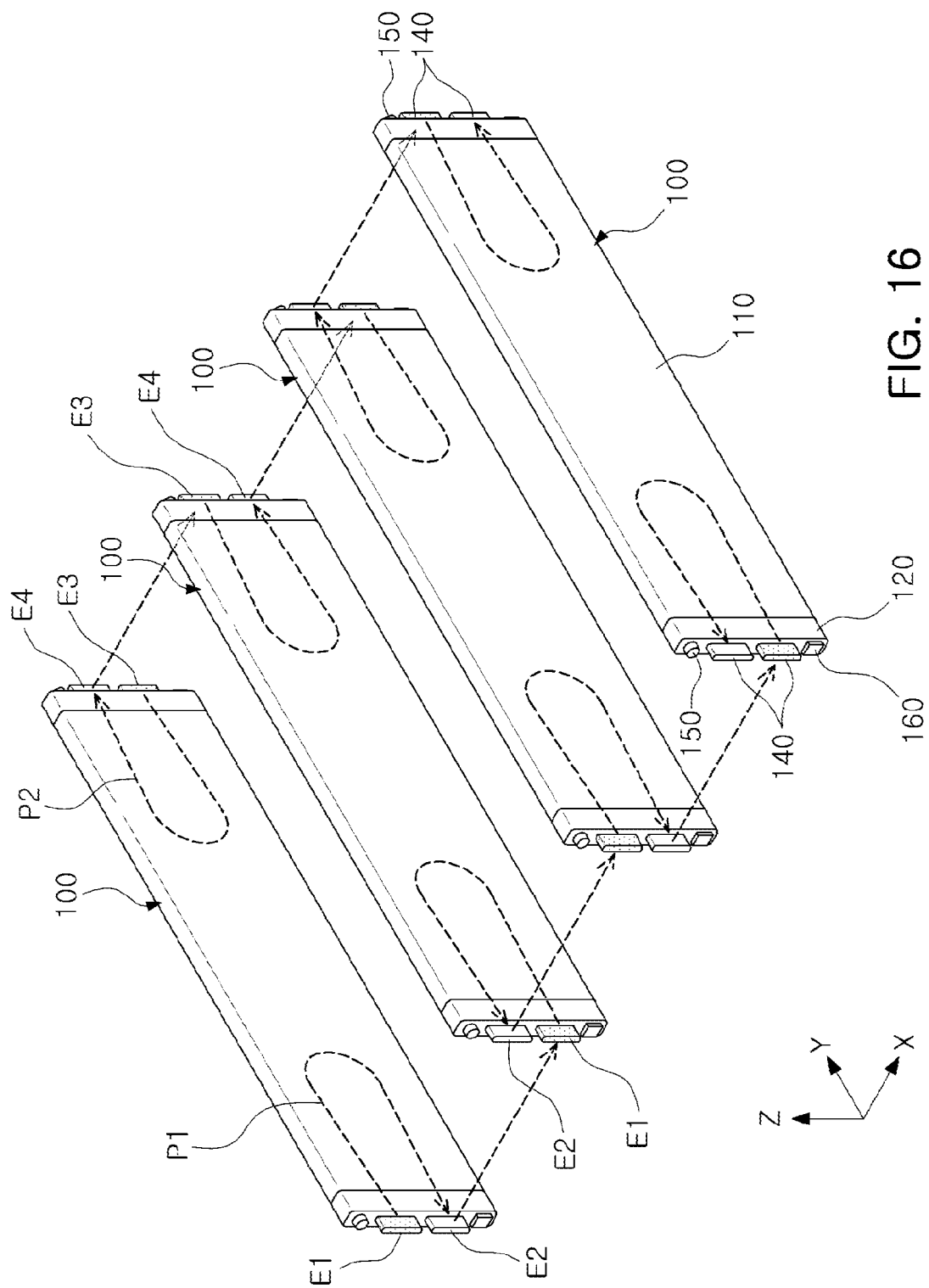
FIG. 16 is a schematic view illustrating an example of a terminal connection structure of the battery cell illustrated in FIG. 14.

In the battery cell 100 illustrated in FIGS. 14, 15A, and 16, a plurality of electrode connection parts 132 may extend from both ends of an electrode plate 132 in a length direction while being spaced apart from each other. That is, an electrode connection portion 132 may be disposed on different height levels, based on a height direction Z of the electrode assembly 130.

In addition, the terminal 140 may have a structure electrically connected to the electrode connection portion 132, and may include a plurality of terminals 140 provided on each of both sides of the casing 110 in a length direction. The plurality of terminals 140 may be exposed outwardly of the casing 110 through the cover plate 120.

For example, two terminals 140 and two electrode connection portions 132 may be disposed on each of both ends of the battery cell 100 while being spaced apart from each other. That is, as illustrated in FIG. 15A, a first terminal E1 and a second terminal E2 may be disposed on one side of the battery cell 100, and a third terminal E3 and a fourth terminal E4 may be disposed on the other side of the battery cell 100.

As described above, when the plurality of terminals 140 are respectively installed on both ends of the battery cell 100 in the length direction, an internal resistance of the battery cell 100, in particular, a resistance of the terminal 140 may be reduced. Specifically, when two terminals 140 are exposed outwardly on each of each of both ends as illustrated in FIG. 15A, an entire cross-sectional area of the terminal 140 may be increased, as compared with a cross-sectional area when a single terminal 140 is exposed outwardly on each of both ends as illustrated in FIG. 15B. That is, in the case in which the terminals 140 illustrated in FIGS. 15A and 15B have the same height H and thickness, the cross-sectional area when two terminals 140 are disposed on each of both ends may be increased two times, as compared with the cross-sectional area when a single terminal 140 is disposed on each of both ends. Since the resistance of the terminal 140 is inversely proportional to the entire cross-sectional area of the terminal 140, in the case of the battery cell 100 illustrated in FIG. 15A, resistance of the terminal 140 may be reduced by half, as compared with the case of the battery cell illustrated in FIG. 15B.

In addition, the first terminal E1 and the second terminal E2 on one side of the battery cell 100 may be configured to have different polarities (positive and negative polarities), and the third terminal E3 and the fourth terminal E4 on the other side of the battery cell 100 may also be configured to have different polarities. As described above, in the case in which the terminals 140 disposed on both ends of the battery cell 100 in the length direction have different polarities, as illustrated in FIG. 15A, a sum of total lengths of current paths P1 and P2 may be doubled, as compared with the case in which a current path P is formed in one direction throughout an total length L of the electrode plate 131 as illustrated in FIG. 15B. In addition, in the case of the battery cell 100 illustrated in FIG. 15A, since a current path is formed for half of the total length L of the electrode plate 131, a length of the electrode plate 131 may be reduce by half (L/2), based on a terminal on one side. Since resistance of a current flowing through the electrode plate 131 is inversely proportional to the length of the current path and is proportional to the length of the electrode plate, the battery cell 100 illustrated in FIG. 15A may have an effect of reducing the resistance of the electrode assembly 130 by a quarter, as compared with the battery cell illustrated in FIG. 15B.

Internal resistance of the battery cell 100 may include not only resistance of the electrode assembly 130 but also resistance of the terminal 140, polarization resistance, electrolyte resistance, and the like. In the battery cell 100 illustrated in FIG. 15A, the resistance of the electrode assembly 130 may be significantly reduced to ¼, compared to the battery cell 100 illustrated in FIG. 15B. Therefore, the internal resistance may be reduced by 50% or more even when other resistance factors are taken into consideration.

Referring to FIG. 16, a plurality of battery cells 100 having terminals E1, E2, E3, and E4, respectively having different polarities, are disposed on one side and the other side in a horizontal direction X, and battery cells adjacent to each other in the horizontal direction X (or a group of the adjacent battery cells) may be disposed in the state in which they are phase-shifted by 180 degrees, based on a length direction Y, that is, opposite polarities thereof are adjacent to each other. In this case, a current path P1 formed on one side of the battery cell 100 may be in the form of sequentially passing through a first terminal E1 and a second terminal E2 of a first battery cell 100, a first terminal E1 and a second terminal of a second battery cell 100, and the like. In addition, a current path P2 formed on the other side of the battery cell 100 may be in the form of sequentially passing a third terminal E3 and a fourth terminal E4 of the first battery cell 100, a third terminal E3 and a fourth terminal E4 of the second battery 100, and the like.

In FIG. 16, opposite polarities are illustrated as being adjacent to each other in each battery cell 100. However, a plurality of battery cells 100 having the same polarity may be grouped, and opposite polarities may be disposed to be adjacent to each other, based on the grouped battery cells 100.

In addition, the structure of the battery cell 100 according to an exemplary embodiment is not limited to a structure in which the two terminals 140 disposed on both ends of the casing 110 in the length direction include terminals having different polarities, and the two terminals 140 disposed on one side of the casing 110 in the length direction may include terminals having the same polarity (for example, positive polarity), and the two terminals 140 disposed on the other side may include terminals having the same polarity (for example, negative polarity).

Next, a battery module 200 according to an exemplary embodiment will be described with reference to FIGS. 17 to 20.

Figure 17:
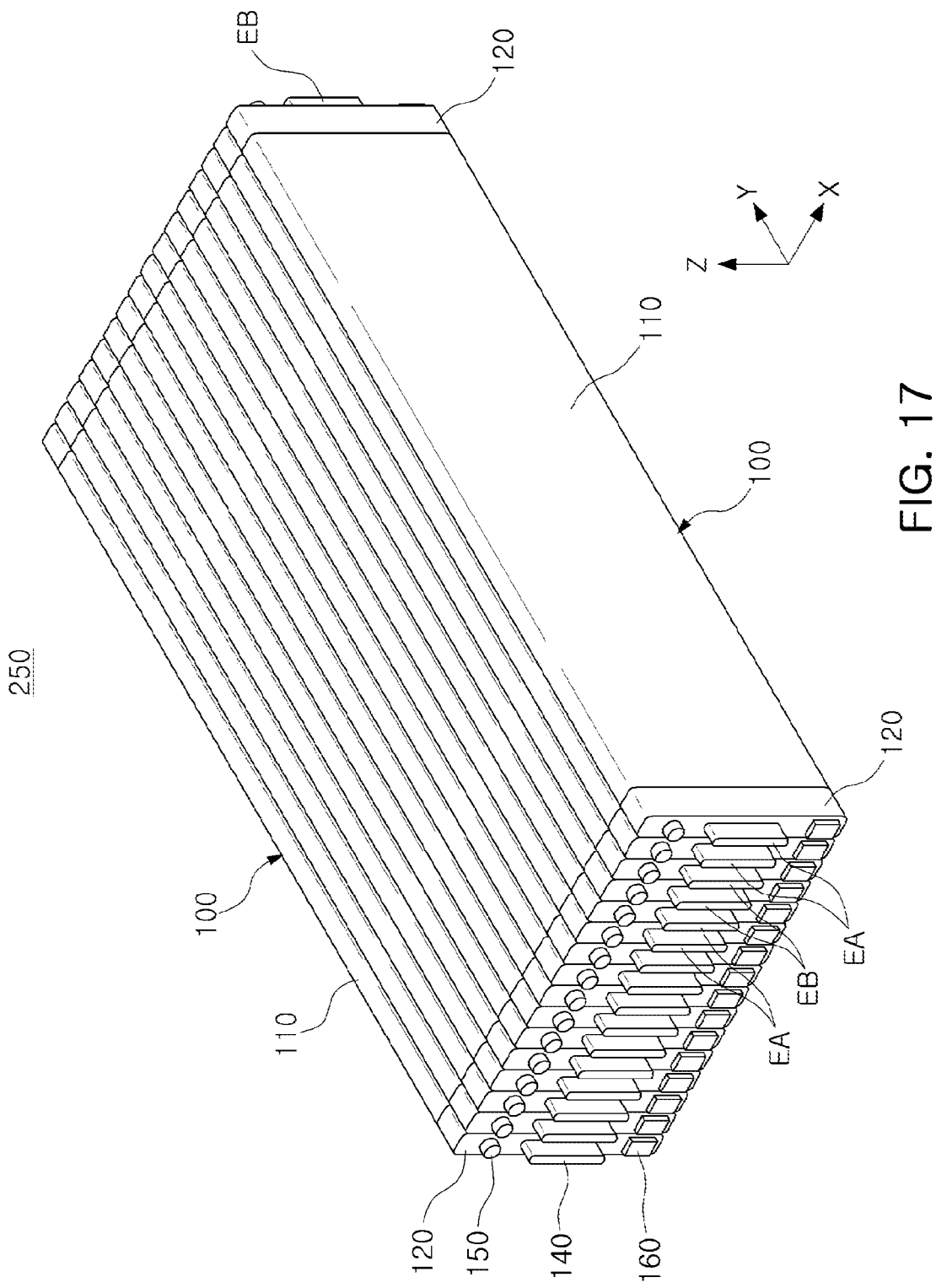
FIG. 17 is a perspective view of a cell stack assembly formed by stacking a plurality of battery cells illustrated in FIG. 4.
Figure 18:
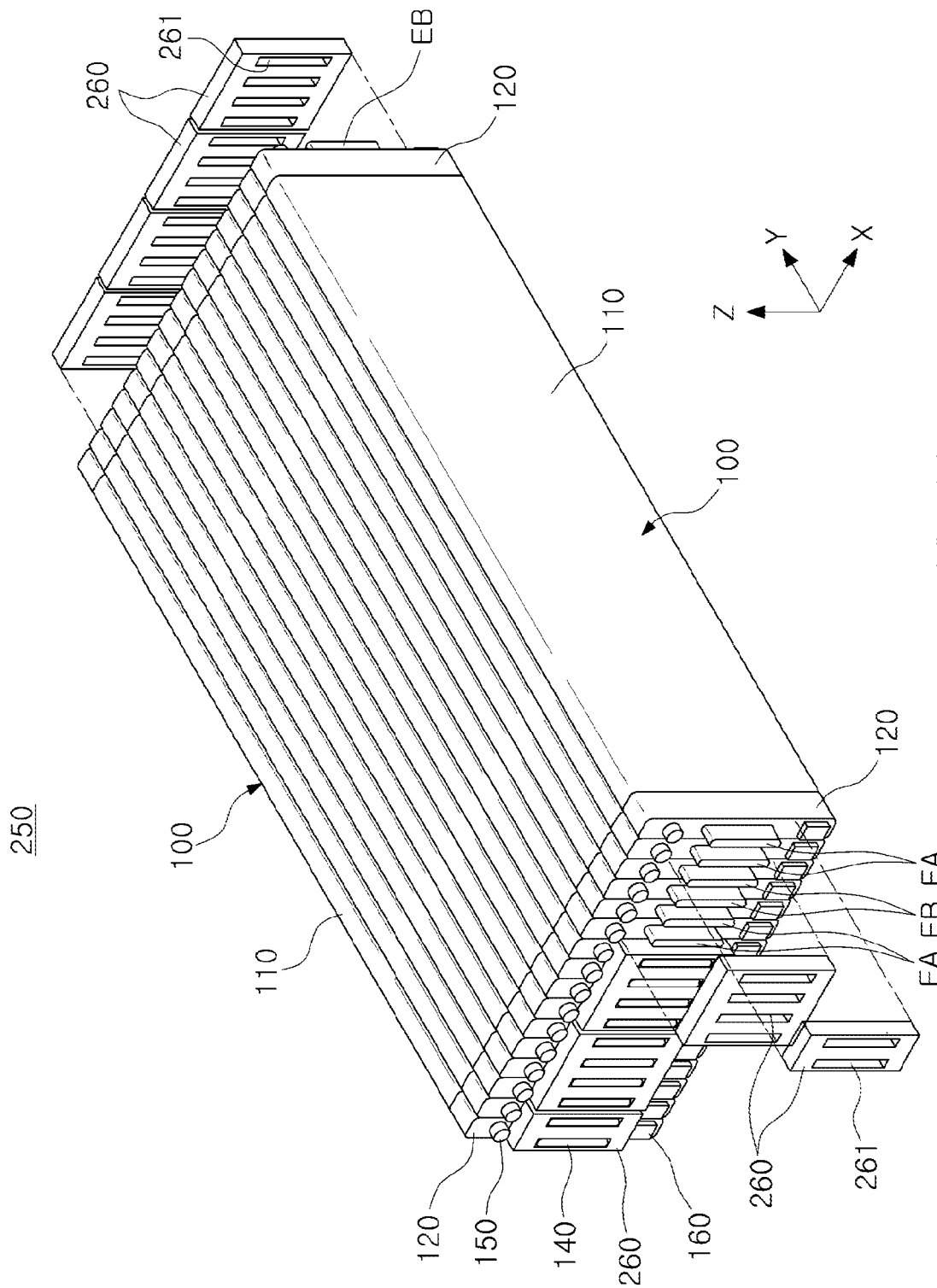
FIG. 18 is a perspective view illustrating the state in which a bus bar is connected to the cell stack assembly of FIG. 17.
Figure 19:
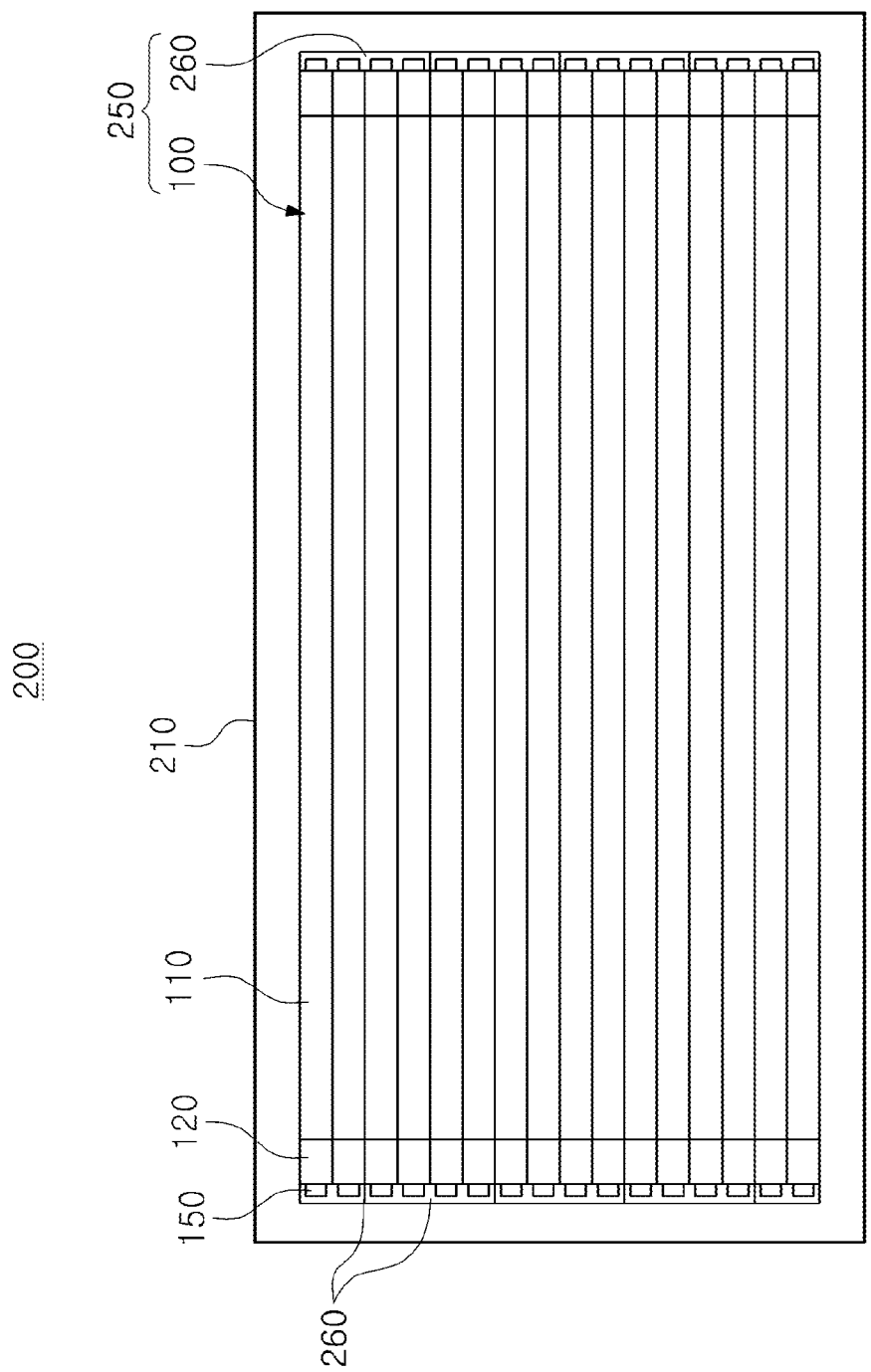
FIG. 19 is a schematic view of a battery module according to an exemplary embodiment of the present disclosure.
Figure 20:
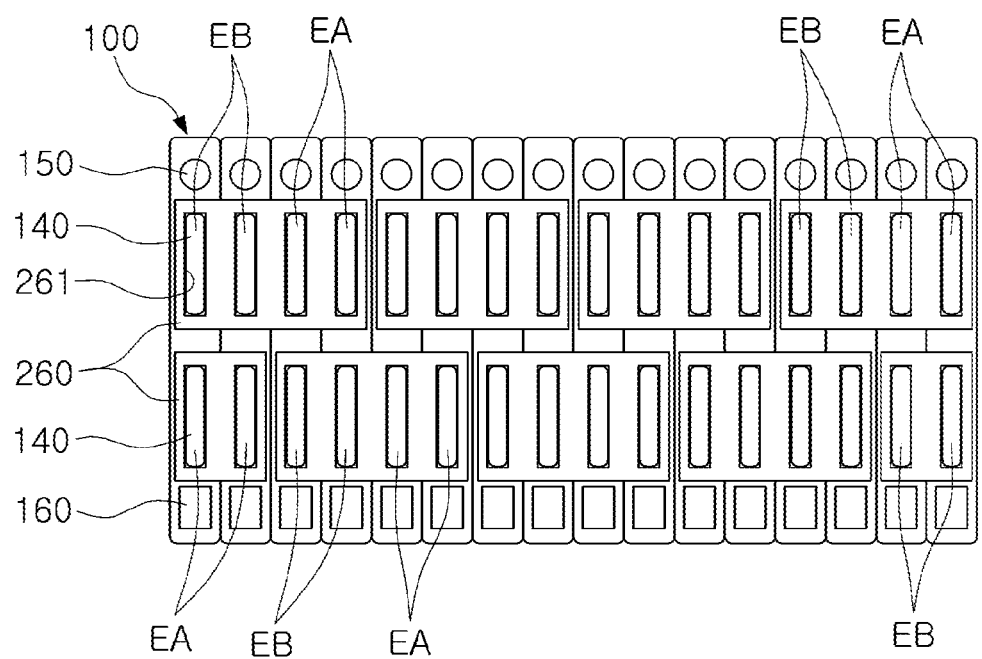
FIG. 20 is a front view of a cell stack assembly formed by stacking a plurality of battery cells illustrated in FIG. 14, when taken in a direction of a terminal.

FIG. 17 is a perspective view of a cell stack assembly 250 formed by stacking a plurality of battery cells illustrated in FIG. 4, FIG. 18 is a perspective view illustrating the state in which a bus bar 260 is connected to the cell stack assembly 250 of FIG. 17, FIG. 19 is a schematic view of a battery module 200 according to an exemplary embodiment, and FIG. 20 is a front view of a cell stack assembly 250 formed by stacking a plurality of battery cells 100 illustrated in FIG. 14, when taken in a direction of a terminal 140.

The battery module 200 may include a module housing 210 having a space formed therein, a plurality of battery cells 100, and a bus bar 260.

Referring to FIG. 17, the plurality of battery cells 100 may be stacked to form a cell stack assembly 250. To this end, the battery cells 100 may be attached to each other by a double-sided tape. However, a configuration of maintaining the coupled state of the plurality of battery cells 100 is not limited thereto, and a periphery of the plurality of battery cells 100 may be wrapped with a tape.

The bus bar 260 having electric conductivity, electrically connecting the terminals 140 of the battery cell 100 to each other, may be connected to the cell stack assembly 250. The bus bar 260 may be provided with a terminal connection portion 261 connected to the terminal 140. As illustrated in FIG. 18, the terminal connection portion 261 may be in the form of a hole through which the terminal 140 passes, but may also be in the form of a groove into which the terminal 140 is inserted.

In this case, since the terminal 140 has a structure exposed outwardly of the casing 110 in a large area, heat generated inside the battery cell 100 may be easily discharged to an external entity, and an electrical connection to the bus bar 260 may be easily and simply provided. Unlike the pouch-type battery cell 10 according to the related art, welding is not necessarily required to bond the battery cell 100 and a bus bar (260 in FIG. 18). Instead of welding, a non-welding bonding method, for example, stationary fit coupling, screw coupling, nut and bolt coupling, hook coupling, press-fit coupling, or the like, may be used. Accordingly, electrical resistance caused by welding may be reduced and an overall lifespan of the battery cell 100 may be increased.

Referring to FIG. 18, in the cell stack assembly 250, a plurality of battery cells 100 having terminals EA and EB having different polarities may be disposed on one side and the other side in a horizontal direction X, respectively. In this case, battery cells adjacent to each other in the horizontal direction X or a group of the adjacent battery cells may be arranged in the state in which they are phase-shifted by 180 degrees, based on a length direction Y, that is, opposite polarities thereof are adjacent to each other. For example, in FIG. 18, first and second battery cells from right side may have a first polarity terminal EA on one side and a second polarity terminal EB on the other side. Third and fourth battery cells from the right side may have a second polarity terminal EB on one side and a first polarity terminal EA on the other side. Fifth and sixth battery cells from the right side may have a first polarity terminal EA on one side and a second polarity terminal EB on the other side. In this case, a first bus bar 260 from the right side, provided on the one side of the cell stack assembly 250, may be configured to connect two first polarity terminals EA provided on one side of each of the first and second battery cells from the right side. A second bus bar 260 from the right may be configured to connect the two second polarity terminals EB, provided on one side of each of the third and fourth battery cells from the right side, to the two first polarity terminal EA provided on the one side of each of the fifth and sixth battery cells from the right side. The first bus bar 260, provided on the other side of the cell stack assembly 250, may be configured to connect two second polarity terminal EB, provided on the other side of each of the first and second battery cells from the right side, to two first polarity terminals EA provided on the other side of each of the third and fourth battery cells from the right side. However, in the cell stack assembly 250, the serial/parallel connection structures of the bus bar 260 and the terminal 140 may be changed in various forms.

In the cell stack assembly 250 illustrated in FIG. 20, the battery cell 100, having both sides on which two terminals 140 are respectively disposed, is connected to the bus bar 260. The two terminals 140, provided on each of one side and the other side, may be configured to have different polarities.

Referring to FIG. 20, first and second battery cells 100 from left side may have a first polarity terminal EA in a lower portion, third and fourth battery cells 100 from left have second polarity terminals EB in a lower portion, and the fifth and sixth battery cells 100 from left side may be configured to have a first polarity terminal EA in a lower portion. In this case, the first bus bar 260 in the left lower portion may be configured to connect the two first polarity terminals EA, and the second bus bar 260 in the left lower portion may be configured to connect the two second polarity terminals EB to two first polarity terminals EA. In addition, first and second battery cells 100 from the left side may have a second polarity terminal EA in an upper portion, and third and fourth battery cells 100 from the left side may have a first polarity terminal EA in an upper portion. In this case, the first bus bar 260 in a left upper portion may be configured to connect the two second polarity terminals EB to the two first polarity terminals EA. However, in the cell stack assembly 250, the serial/parallel connection structures of the bus bar 260 and the terminal 140 may be changed in various forms.

The plurality of stacked battery cells 100 and the bus bar 260, electrically connecting the battery cells 100 to each other, may be accommodated in a module housing 210, as illustrated in FIG. 19, to constitute a battery module 200.

Figure 21:
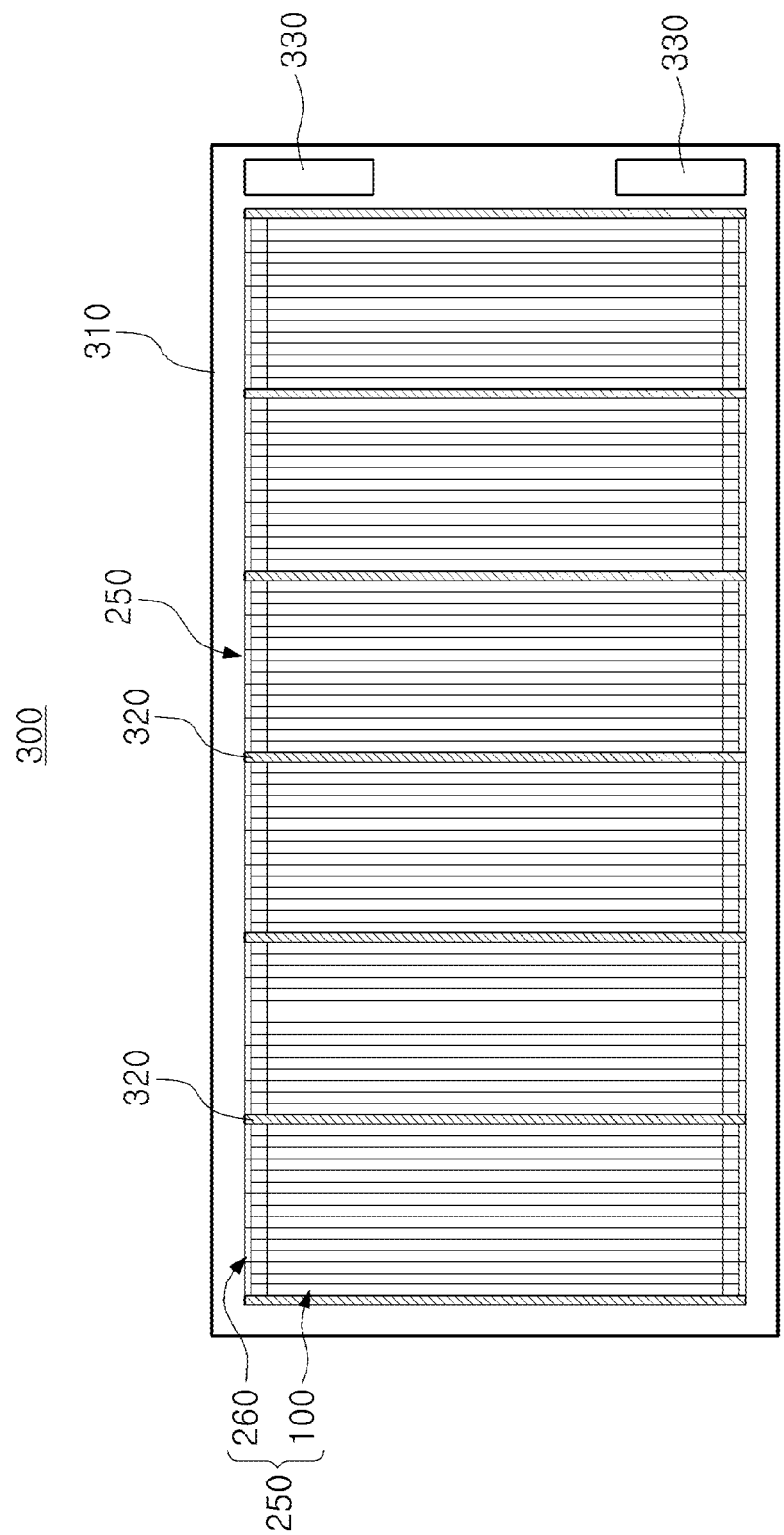
FIG. 21 is a schematic view of a battery pack according to an exemplary embodiment of the present disclosure.

Finally, a battery pack 300 according to an exemplary embodiment will be described with reference to FIG. 21. FIG. 21 is a schematic view of a battery pack 300 according to an exemplary embodiment of the present disclosure.

As illustrated in FIG. 21, the battery pack 300 may include a pack housing 310, having a space formed therein, and a partition wall member 320 defining an internal space of the pack housing 310. A plurality of battery cells 100 may be directly installed in the space defined between the partition wall members 320 in the state in which they are stacked.

That is, since the battery cell 100 according to an exemplary embodiment includes a casing 110 having rigidity, the battery cells 100 are directly disposed in the pack housing 310 in the state in which the battery cells are stacked without interposing the battery module therebetween. That is, the battery pack 300 may have a structure in which after forming the cell stack assembly 250 in a state in which the bus bar 260 is connected to the stacked battery cells 100, a plurality of cell stack assemblies 250 are accommodated in the pack housing 310 by regarding the cell stack assembly 250 as a unit. In this case, the battery pack 300 may reduce the volume occupied by a module housing, and thus, the energy density per unit volume of the battery pack 300 may be improved.

A battery control part 330 for controlling the battery cell 100 may be accommodated in the internal space of the pack housing 310. The battery control part 330 may include a battery management system (BMS), or the like.

As described above, exemplary embodiments provide a structure in which an electrode connection portion of an electrode assembly installed inside a casing and a bonding portion of a terminal exposed outwardly of a cover plate are directly bonded to each other. Due to the structure, space loss in a length direction and a height direction may be reduced, as compared with a pouch-type battery cell according to the related art. Thus, energy density may be improved. In particular, an exemplary embodiment provides a structure in which a sealing area A2 for sealing an electrode lead 25 and a pouch 11 and an insulating portion 26 exposed inwardly and outwardly of the sealing area A2 are removed from a pouch-type battery cell according to the related art, so that space loss in a length direction may be significantly reduced, as compared with the pouch-type battery cell according to the related art.

According to an exemplary embodiment, a contact area between an electrode connection portion of an electrode assembly and a terminal may be increased to reduce electrical resistance between the electrode connection portion and the terminal.

According to an exemplary embodiment, since an electrode connection portion of an electrode assembly and a bonding portion may be bonded to each other in the state in which a bonding portion of a terminal is in double contact on both sides of the electrode connection portion, bonding strength between the electrode assembly and the terminal may be improved. In addition, according to an exemplary embodiment, a casing has rigidity and is not easily deformed, as compared with a pouch formed of a flexible material according to the related art. Accordingly, strength of a battery cell may be secured and a sufficient resistance to a swelling phenomenon may be obtained. As a result, stability of a battery may be secured.

According to an exemplary embodiment, an injection hole for injecting an electrolyte into a cover plate may be formed and a stopper member may installed in the injection hole. Thus, the electrolyte may be easily injected through the injection hole, and may be recharged. As a result, a lifespan of a battery cell may be increased.

According to an exemplary embodiment, a venting hole may be formed in a cover plate and a gas discharging member may be installed in the venting hole. Thus, gas generated inside a casing may be easily discharged to an external entity to secure stability of a battery cell.

According to an exemplary embodiment, a periphery of an electrode assembly may be in a length direction may be surrounded by a packaging member. Thus, an electrode assembly having a long, flexible structure may be easily handled. In addition, the packaging member may include a film or a tube formed of a material contracted by heating. Thus, the packaging member may be easily installed on a periphery of an electrode assembly. Moreover, according to an exemplary embodiment, the packaging member may be formed of an insulating material to improve insulating performance between the electrode assembly and a casing.

According to an exemplary embodiment, a plurality of terminals may be installed on each of both ends of a battery cell in a length direction. Thus, an entire cross-sectional area of a terminal body may be increased, as compared with the case in which a single terminal is installed on each of both ends. As a result, internal resistance of the battery cell, in particular, resistance of the terminal may be reduced. In addition, terminals, respectively disposed on both ends of the battery cell in the length direction, have different polarities, so that current path quantity may be reduced. As a result, internal resistance of the battery cell, in particular, foil resistance of the electrode assembly may be significantly reduced.

According to an exemplary embodiment, since an external surface of a casing is planar, a contact area with a counter component installed for cooling may be sufficiently secured. Thus, heat dissipation and cooling performance of a battery cell may be sufficiently secured.

According to an exemplary embodiment, a thickness and/or a height of a terminal may be increased, so that an exposed area of the terminal exposed outwardly of a casing may be increased. Thus, heat generated inside a battery cell may be easily discharged.

According to an exemplary embodiment, since a terminal is exposed outwardly of a casing in a large area, an electrical connection between a plurality of battery cells may be easily provided by a contact of the terminal with a bus bar, and an electrical connection structure may be simplified. In particular, since the terminal and the bus bar do not need to be bonded by welding, a lifespan of the battery cell may be increased, as compared with the pouch-type battery cell, in which an electrode lead passes through an insulating member and is then bonded to a bus bar by welding, according to the related art.

According to an exemplary embodiment, since a terminal is exposed outwardly of a casing in a large area, a voltage/temperature sensing structure of an individual battery cell may be easily implemented.

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery cell comprising:
a casing having an accommodation space formed therein and having both ends open;
a cover plate comprising a first cover plate covering a first end of the casing and a second cover plate covering a second end of the casing, the second end of the casing being opposite to the first end of the casing;
an electrode assembly accommodated in the accommodation space, in which a plurality of electrode plates are arranged with a separator interposed therebetween, the electrode assembly comprising electrode connection portions, respectively extending from the plurality of electrode plates; and
a terminal bonded to each electrode connection portion and having a portion exposed outwardly through the cover plate,
wherein the electrode connection portion comprises two first connection portions extending from a first end of the electrode plate in a length direction of the casing and being spaced apart from each other in a height direction of the casing, and two second connection portions extending from a second end of the electrode plate in a length direction of the casing and being spaced apart from each other in the height direction of the casing, the second end of the electrode plate being opposite to the first end of the electrode plate, the height direction of the casing being perpendicular to the length direction of the casing and a thickness direction of the casing,
the terminal comprises two first terminals coupled to the two first connection portions and exposed outwardly through the first cover plate in the length direction of the casing while being spaced apart from each other in the height direction of the casing, and two second terminals coupled to the two second connection portions and exposed outwardly through the second cover plate in the length direction of the casing while being spaced apart from each other in the height direction of the casing,
the two first terminals have different polarities and the two second terminals have different polarities,
a first current path is formed through the two first terminals exposed outwardly and a first part of the electrode assembly adjacent to the two first terminals in the length direction of the casing,
a second current path is formed through the two second terminals exposed outwardly and a second part of the electrode assembly adjacent to the two second terminals in the length direction of the casing, and
the first current path is formed in a region corresponding to a portion of a total length of the electrode assembly and the second current path is formed in a region corresponding to another portion of the total length of the electrode assembly.

2. The battery cell of claim 1, wherein the terminal comprises a bonding portion, bonded to the electrode connection portion, and a terminal body electrically connected to the bonding portion and exposed outwardly through the cover plate.

3. The battery cell of claim 2, wherein the electrode connection portion and the bonding portion are bonded to each other while overlapping each other in a length direction of the casing.

4. The battery cell of claim 3, wherein the electrode connection portion and the bonding portion are bonded to each other while an end surface of the electrode connection portion is in contact with the terminal body.

5. The battery cell of claim 2, wherein the terminal has an L-shaped, T-shaped, or U-shaped cross-sectional profile.

6. The battery cell of claim 2, wherein the terminal has a plurality of bonding portions extend from the terminal body at a predetermined gap,
the plurality of bonding portions are configured to be in contact with both side surfaces of the electrode connection portion, and
the electrode connection portion and the plurality of bonding portion are bonded to each other while overlapping each other in a length direction of the casing.

7. The battery cell of claim 2, wherein the electrode connection portion and the bonding portion are bonded to each other while overlapping each other, and at least one of the bonding portion and the electrode connection portion is then bent at least once.

8. The battery cell of claim 1, wherein the electrode connection portion extends from a center of the electrode assembly, or extends in a position offset from the center of the electrode assembly, based on a thickness direction of the electrode assembly.

9. The battery cell of claim 1, wherein the electrode connection portion extends from an external portion of the electrode assembly, in a length direction of the electrode assembly, and the electrode connection portion is bent in a thickness direction of the electrode assembly.

10. The battery cell of claim 1, further comprising:
a packaging member surrounding a periphery of the electrode assembly in a length direction,
wherein the packaging member comprises a film or a tube formed of a material having at least one of heat shrinkage and insulating properties.

11. The battery cell of claim 1, wherein a length of the electrode plate in the length direction of the casing is equal to more than twice to less than 25 times a height of the electrode plate in the height direction of the casing.

12. The battery cell of claim 2, wherein, in the thickness direction of the casing, the terminal body has a thickness greater than a thickness of the boding portion.

13. The battery cell of claim 2, wherein, in the height direction of the casing, the terminal body has a height greater than or equal to a height of the bonding portion.

14. The battery cell of claim 1, wherein a gas discharging member for discharging gas, generated in the accommodation space of the casing, to an external entity is installed on the cover plate.

15. A battery module comprising:
a module housing having a space formed therein;
a plurality of battery cells accommodated in the module housing; and
a bus bar connecting terminals of the plurality of battery cells,
wherein the battery cell comprises: a casing having an accommodation space formed therein and having both ends open; a cover plate comprising a first cover plate covering a first end of the casing and a second cover plate covering a second end of the casing, the second end of the casing being opposite the first end of the casing; an electrode assembly accommodated in the accommodation space, in which a plurality of electrode plates are arranged with a separator interposed therebetween, the electrode assembly comprising electrode connection portions, respectively extending from the plurality of electrode plates; and a terminal bonded to each electrode connection portion and having a portion exposed outwardly through the cover plate,
wherein the electrode connection portion comprises two first connection portions extending from a first end of the electrode plate in a length direction of the casing and being spaced apart from each other in a height direction of the casing, and two second connection portions extending from a second end of the electrode plate in a length direction of the casing and being spaced apart from each other in the height direction of the casing, the second end of the electrode plate being opposite to the first end of the electrode plate, the height direction of the casing being perpendicular to the length direction of the casing and a thickness direction of the casing,
the terminal comprises two first terminals coupled to the two first connection portions and exposed outwardly through the first cover plate in the length direction of the casing while being spaced apart from each other in the height direction of the casing, and two second terminals coupled to the two second connection portions and exposed outwardly through the second cover plate in the length direction of the casing while being spaced apart from each other in the height direction of the casing,
the two first terminals have different polarities and the two second terminals have different polarities,
a first current path is formed through the two first terminals exposed outwardly and a first part of the electrode assembly adjacent to the two first terminals in the length direction of the casing,
a second current path is formed through the two second terminals exposed outwardly and a second part of the electrode assembly adjacent to the two second terminals in the length direction of the casing, and
the first current path is formed in a region corresponding to a portion of a total length of the electrode assembly and the second current path is formed in a region corresponding to another portion of the total length of the electrode assembly.

16. A battery pack comprising:
a cell assembly in which a plurality of battery cells are arranged, the cell assembly comprising a bus bar connected to terminals of the plurality of battery cells; and
a pack housing having a space formed therein such that a plurality of cell assemblies are accommodated in the space,
wherein the battery cell comprises: a casing having an accommodation space formed therein and having both ends open; a cover plate comprising a first cover plate covering a first end of the casing and a second cover plate covering a second end of the casing, the second end of the casing being opposite the first end of the casing; an electrode assembly accommodated in the accommodation space, in which a plurality of electrode plates are arranged with a separator interposed therebetween, the electrode assembly comprising electrode connection portions, respectively extending from the plurality of electrode plates; and a terminal bonded to each electrode connection portion and having a portion exposed outwardly through the cover plate, and
wherein the plurality of cell assemblies are accommodated in the pack housing by regarding the cell assembly as a unit,
wherein the electrode connection portion comprises two first connection portions extending from a first end of the electrode plate in a length direction of the casing and being spaced apart from each other in a height direction of the casing, and two second connection portions extending from a second end of the electrode plate in a length direction of the casing and being spaced apart from each other in the height direction of the casing, the second end of the electrode plate being opposite to the first end of the electrode plate, the height direction of the casing being perpendicular to the length direction of the casing and a thickness direction of the casing,
the terminal comprises two first terminals coupled to the two first connection portions and exposed outwardly through the first cover plate in the length direction of the casing while being spaced apart from each other in the height direction of the casing, and two second terminals coupled to the two second connection portions and exposed outwardly through the second cover plate in the length direction of the casing while being spaced apart from each other in the height direction of the casing, the two first terminals have different polarities and the two second terminals have different polarities,
a first current path is formed through the two first terminals exposed outwardly and a first part of the electrode assembly adjacent to the two first terminals in the length direction of the casing,
a second current path is formed through the two second terminals exposed outwardly and a second part of the electrode assembly adjacent to the two second terminals in the length direction of the casing, and
the first current path is formed in a region corresponding to a portion of a total length of the electrode assembly and the second current path is formed in a region corresponding to another portion of the total length of the electrode assembly.

* * * * *